US011673197B2

(12) United States Patent
Mirkin et al.

(10) Patent No.: US 11,673,197 B2
(45) Date of Patent: Jun. 13, 2023

(54) TETRAHEXAHEDRA NANOPARTICLES

(71) Applicant: NORTHWESTERN UNIVERSITY, Evanston, IL (US)

(72) Inventors: Chad A. Mirkin, Wilmette, IL (US); Liliang Huang, Evanston, IL (US); Haixin Lin, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 45 days.

(21) Appl. No.: 17/263,832

(22) PCT Filed: Jul. 31, 2019

(86) PCT No.: PCT/US2019/044263
§ 371 (c)(1),
(2) Date: Jan. 27, 2021

(87) PCT Pub. No.: WO2020/028450
PCT Pub. Date: Feb. 6, 2020

(65) Prior Publication Data
US 2021/0299749 A1  Sep. 30, 2021

Related U.S. Application Data

(60) Provisional application No. 62/712,416, filed on Jul. 31, 2018.

(51) Int. Cl.
B22F 9/18 (2006.01)
C25B 11/089 (2021.01)
(Continued)

(52) U.S. Cl.
CPC .............. B22F 9/18 (2013.01); B01J 23/56 (2013.01); B22F 1/054 (2022.01); B22F 1/07 (2022.01); B22F 9/30 (2013.01); C25B 1/01 (2021.01); C25B 1/23 (2021.01); C25B 11/089 (2021.01); B22F 1/0553 (2022.01);
(Continued)

(58) Field of Classification Search
None
See application file for complete search history.

(56) References Cited

U.S. PATENT DOCUMENTS

2010/0324310 A1* 12/2010 Dumesic ................. C07C 51/00
585/324
2013/0236815 A1* 9/2013 Sun ....................... H01M 4/921
502/184
(Continued)

FOREIGN PATENT DOCUMENTS

CN  105081308 A    11/2015
CN  115472846 A  * 12/2022
(Continued)

OTHER PUBLICATIONS

English translation of JP 2007-091578 (originally published Apr. 12, 2007) obtained from PE2E search.*
(Continued)

Primary Examiner — George Wyszomierski
(74) Attorney, Agent, or Firm — Marshall, Gerstein & Borun LLP

(57) ABSTRACT

Provided herein are methods of preparing tetrahexahedra nanoparticles and methods of using the tetrahexahedra nanoparticles as an oxidative catalyst.

22 Claims, 26 Drawing Sheets

(51) Int. Cl.
| | |
|---|---|
| C25B 1/23 | (2021.01) |
| C25B 1/01 | (2021.01) |
| B22F 9/30 | (2006.01) |
| B22F 1/07 | (2022.01) |
| B22F 1/054 | (2022.01) |
| B01J 23/56 | (2006.01) |
| B82Y 30/00 | (2011.01) |
| B82Y 40/00 | (2011.01) |

(52) U.S. Cl.
CPC ........... *B22F 2301/25* (2013.01); *B82Y 30/00* (2013.01); *B82Y 40/00* (2013.01)

(56) References Cited

U.S. PATENT DOCUMENTS

| | | | |
|---|---|---|---|
| 2014/0193730 | A1 | 7/2014 | Martinez et al. |
| 2017/0203369 | A1* | 7/2017 | Mirkin ...................... B22F 9/24 |
| 2018/0316023 | A1* | 11/2018 | Fang .................... B01J 37/0072 |

FOREIGN PATENT DOCUMENTS

| | | | |
|---|---|---|---|
| JP | 2007091578 | A * | 4/2007 |
| KR | 2017-0024726 | A | 3/2017 |
| KR | 101828388 | B1 | 2/2018 |

OTHER PUBLICATIONS

European Patent Application No. 19843989.5, Extended European Search Report, dated Mar. 25, 2022.
International Search Report and Written Opinion, corresponding International Application No. PCT/US2019/44263, dated Oct. 21, 2019.
International Preliminary Report on Patentability, corresponding International Application No. PCT/US2019/044263, dated Feb. 11, 2021.
Tian, N et al., Synthesis of Tetrahexahedral Platinum Nanocrystals with High-Index Facets and High Electro-Oxidation Activity, Science. vol. 316. pp. 732-735, May 4, 2007.
Zhang et al., Engineering high-energy surfaces of noble metal nanocrystals with enhanced catalytic performances. *Nano Today* 11, 661-677 (2016).
Tian et al., Platinum metal catalysts of high-index surfaces: from single-crystal planes to electrochemically shape-controlled nanoparticles. *J. Phys. Chem. C* 112, 19801-19817 (2008).
Xia et al., On the role of surface diffusion in determining the shape or morphology of noble-metal nanocrystals. *Proc. Natl. Acad. Sci. U.S.A* 110, 6669-6673 (2013).
Lee et al., Morphological control of catalytically active platinum nanocrystals. *Angew. Chem. Int. Ed.* 118, 7988-7992 (2006).
Wang et al., Heteroepitaxial growth of high-index-faceted palladium nanoshells and their catalytic performance. *J. Am. Chem. Soc.* 133, 1106-1111 (2010).
Personick et al., Shape control of gold nanoparticles by silver underpotential deposition. *Nano Lett.* 11, 3394-3398 (2011).
Niu et al., Removal and utilization of capping agents in nanocatalysis. *Chem. Mater.* 26, 72-83 (2013).
Bernard et al., a quantitative phase map. *ACS Nano* 3, 1431-1436 (2009).
An et al., Highly active N-PtTe/reduced graphene oxide intermetallic catalyst for formic acid oxidation. *Nano Energy* 15, 24-32 (2015).
Kang et al., Highly active Pt3Pb and core-shell Pt3Pb—Pt electrocatalysts for formic acid oxidation. *ACS Nano* 6, 2818-2825 (2012).
Chen et al., Significantly enhancing catalytic activity of tetrahexahedral Pt nanocrystals by Bi adatom decoration. *J. Am. Chem. Soc.* 133, 12930-12933 (2011).
Yu et al., Pb and Sb modified Pt/C catalysts for direct formic acid fuel cells. *Electrochim. Acta* 55, 7354-7361 (2010).
Lee et al., Influence of underpotentially deposited Sb onto Pt anode surface on the performance of direct formic acid fuel cells. *Electrochim. Acta* 53, 6089-6092 (2008).
Herrero et al., Oxidation of formic acid on Pt (111) electrodes modified by irreversibly adsorbed tellurium. *J. Electroanal. Chem.* 394, 161-167 (1995).
Clavilier et al., Heterogeneous electrocatalysis on well defined platinum surfaces modified by controlled amounts of irreversibly adsorbed adatoms: Part I. Formic acid oxidation on the Pt (111)-Bi system. *J. Electroanal. Chem.* 258, 89-100 (1989).
Capon, R. Parsons, The oxidation of formic acid at noble metal electrodes Part III. Intermediates and mechanism on platinum electrodes. *J. Electroanal. Chem.* 45, 205-231 (1973).
Rice et al, Direct formic acid fuel cells. *J. Power Sources.* 111, 83-89 (2002).
Huang et al., Catalyst design by scanning probe block copolymer lithography. *Proc. Natl. Acad. Sci.* 115, 3764-3769 (2018).
Kang, et al., Design of Pt—Pd binary superlattices exploiting shape effects and synergistic effects for oxygen reduction reactions. *J. Am. Chem. Soc.* 135, 42-45 (2012).
Xie et al., Shape-controlled syntheses of rhodium nanocrystals for the enhancement of their catalytic properties. *Nano Res.* 8, 82-96 (2015).
G. Kresse, J. Furthmüller, Efficient iterative schemes for ab initio total-energy calculations using a plane-wave basis set. *Phys. Rev. B* 54, 11169 (1996).
G. Kresse, J. Furthmüller, Efficiency of ab-initio total energy calculations for metals and semiconductors using a plane-wave basis set. *Comput. Mater. Sci.* 6, 15-50 (1996).
G. Kresse et al., From ultrasoft pseudopotentials to the projector augmented-wave method. *Phys. Rev. B* 59, 1758 (1999).
Morgan et al., Metal redispersion strategies for recycling of supported metal catalysts: a perspective. *ACS Catal.* 5, 3430-3445 (2015).
Zhang et al., Calculation of the surface energy of fcc metals with modified embedded-atom method. *Appl. Surf. Sci.* 229, 34-42 (2004).
Wen et al., Surface energy calculation of the fcc metals by using the MAEAM. *Solid State Common.* 144, 163-167 (2007).
Avanesian et al., Quantitative and atomic-scale view of CO-induced Pt nanoparticle surface reconstruction at saturation coverage via DFT calculations coupled with in situ TEM and IR. *J. Am. Chem. Soc.* 139, 4551-4558 (2017).
Löffler et al., Kinetics of NH3 decomposition on single crystal planes of Pt. *Surf. Sci.* 59, 195-204 (1976).
Sun et al., Kinetics of dissociative adsorption of formic-acid on Pt (100), Pt (610), Pt (210) and Pt (110) single-crystal electrodes in perchloric-acid solutions. *J. Electroanal. Chem.* 370, 273-280 (1994).
Xia et al., One-dimensional nanostructures: synthesis, characterization, and applications. *Adv. Mater.* 15, 353-389 (2003).
Wu et al., Direct observation of vapor-liquid-solid nanowire growth. *J. Am. Chem. Soc.* 123, 3165-3166 (2001).
Wagner et al., Vapor-liquid-solid mechanism of single crystal growth. *Appl. Phys. Lett.* 4, 89-90 (1964).
Tian et al.,, Synthesis of tetrahexahedral platinum nanocrystals with high-index facets and high electro-oxidation activity. *Science* 316, 732-735 (2007).
Ermanoski, et al., Atomic structure of O/Ir (210) nanofacets. *Surf. Sci.* 596, 89-97 (2005).
Tao et al., Break-up of stepped platinum catalyst surfaces by high CO coverage. *Science* 327, 850-853 (2010).
Momma et al., VESTA 3 for three-dimensional visualization of crystal, volumetric and morphology data. *J. Appl. Crystallogr.* 44, 1272-1276 (2011).
Kolthoff, et al., Adsorbate-induced faceting of a nearly close-packed surface: Te—Pd (100). *Surf. Sci.* 447, 259-271 (2000).
Saal et al., Wolverton, Materials design and discovery with high-throughput density functional theory: the open quantum materials database (OQMD). *JOM* 65, 1501-1509 (2013).
Kirklin et al., The open quantum materials database (OQMD): assessing the accuracy of DFT formation energies, *npj Comput. Mater.* 1, 15010 (2015).

(56) References Cited

OTHER PUBLICATIONS

Tran et al., Surface energies of elemental crystals. *Sci. Data* 3, 160080 (2016).
Nicholas et al., An atlas of models of crystal surfaces. *Phys. Today* 18, 67 (1965).
M. V. Twigg, *Catalyst handbook* (CRC, 1989).
Chinese Patent Application No. 201980056777.0, Office Action, dated Feb. 15, 2023.
Li Tian et al., Electrodeposited PtBi nanoparticles for electrocatalytic oxidation of formic acid, Chinese Journal of Rare Metals, 36(5):745-9 (Sep. 2012).

* cited by examiner

TETRAHEXAHEDRA NANOPARTICLES

This application is a U.S. National Stage of International Patent Application No. PCT/US2019/044263 filed Jul. 31, 2019, which in turn claims the benefit of U.S. Provisional Application 62/712,416 filed on Jul. 31, 2018, which are hereby incorporated by reference in their entireties.

STATEMENT OF US GOVERNMENT SUPPORT

This invention was made with government support under grant number DE-SC0000989-0002, awarded by the Department of Energy. The government has certain rights in the invention.

BACKGROUND

Nanostructures with high index facets are extremely important in catalysis, yet limited ways for producing them at scale exist (Zhang et al., *Nano Today* 11, 661-677 (2016), Tian et al., *J. Phys. Chem. C* 112, 19801-19817 (2008)). Typically, either relatively low throughput electrochemical methods or higher throughput solution-phase methods that rely on facet-stabilizing ligands are used to prepare them. Importantly, the atomic structure of such facets can directly influence catalytic activity, regardless of particle size and composition (Xia et al., *Proc. Natl. Acad. Sci. U.S.A* 110, 6669-6673 (2013), Lee et al., *Angew. Chem. Int. Ed.* 118, 7988-7992 (2006)). However, the use of ligands to control particle shape is limiting for two reasons. First, the role of such agents is not well understood, and different ligands are required, depending on metal type and desired particle shape (Wang et al., *J. Am. Chem. Soc.* 133, 1106-1111 (2010), Personick et al., *Nano Lett.* 11, 3394-3398 (2011)). Second, stabilizing ligands are often difficult to remove and adversely affect catalytic activity by blocking active sites (Niu et al., *Chem. Mater.* 26, 72-83 (2013)). There is a need for the development of a straightforward, ligand-free, and generalizable method for making nanoparticles with high-index facets, efficient electrocatalysts for oxidation reaction such as formic acid oxidation, and methods of recycling waste catalysts.

SUMMARY

Provided herein are methods of preparing tetrahexahedra ("THH") nanoparticles comprising, heating particles comprising a first metal in the presence of a second metal at 500° C. to 1300° C. for about 0.5 hours to about 12 hours to form the THH nanoparticles; wherein the first metal comprises platinum, palladium, rhodium, nickel, cobalt or a combination thereof and the second metal comprises Sb, Bi, Pb, Te, or a combination thereof. In embodiments, the THH nanoparticles comprise high-index facets. In embodiments, the THH nanoparticles comprise one or more of {210} facets, {310} facets, a vicinal plane thereof or a combination thereof. In embodiments, the first metal is bimetallic. In embodiments, the first metal comprises PtNi, PtCo, PtCu, PdPt, PdAu, PdNi, PdCo, PdCu, RhPt, RhCo, RhNi, or a combination thereof.

In embodiments, the methods disclosed herein are performed in a reactor wherein the second metal is oriented upstream of the particles, and carried to the particles via a gas flow. In embodiments, wherein the gas comprises argon, nitrogen, helium, hydrogen, carbon monoxide, carbon dioxide, or a combination thereof.

In embodiments, the particles comprising the first metal are incorporated onto a support. In embodiments, the support comprises silica, titania, ceria, alumina, zirconia, niobium oxide, zinc oxide, iron oxide, vanadium oxide, or a combination thereof. In embodiments, the support is conductive. In embodiments, the conductive support comprises carbon black, graphene, graphite, carbon nanotube, carbon fiber, tungsten carbide, or a combination thereof. In embodiments, the particles are formed by decomposition and/or reduction of a salt of the first metal or the particles are formed from a metal alloy of the first metal. In embodiments, the second metal is formed by decomposition and/or reduction of a salt of the second metal. In embodiments, the first metal comprises platinum. In embodiments, the particles comprising the first metal are non-THH particles. In embodiments, the second metal comprises Sb. In embodiments, the second metal comprises Bi. In embodiments, methods disclosed herein are performed in the absence of an organic ligand.

Also provided herein are methods of using the THH nanoparticles disclosed herein as an oxidative catalyst. In embodiments, the THH nanoparticles catalyze the oxidation of formic acid to CO and/or $CO_2$.

BRIEF DESCRIPTION OF FIGURES

FIG. 33 in (A) shows an SEM image of THH-shaped PtPd particles synthesized on a silicon wafer. FIG. 33 in (B) shows a TEM image, corresponding diffraction patterns, and EDS elemental maps for a THH-shaped PtPd particle. FIG. 33 in (C) STEM images (first column) and EDS elemental maps (second and third columns) for a series of THH-shaped bimetallic particles. Scale bars: 500 nm in (A) and 20 nm in (B and C).

DETAILED DESCRIPTION

Figure 1:
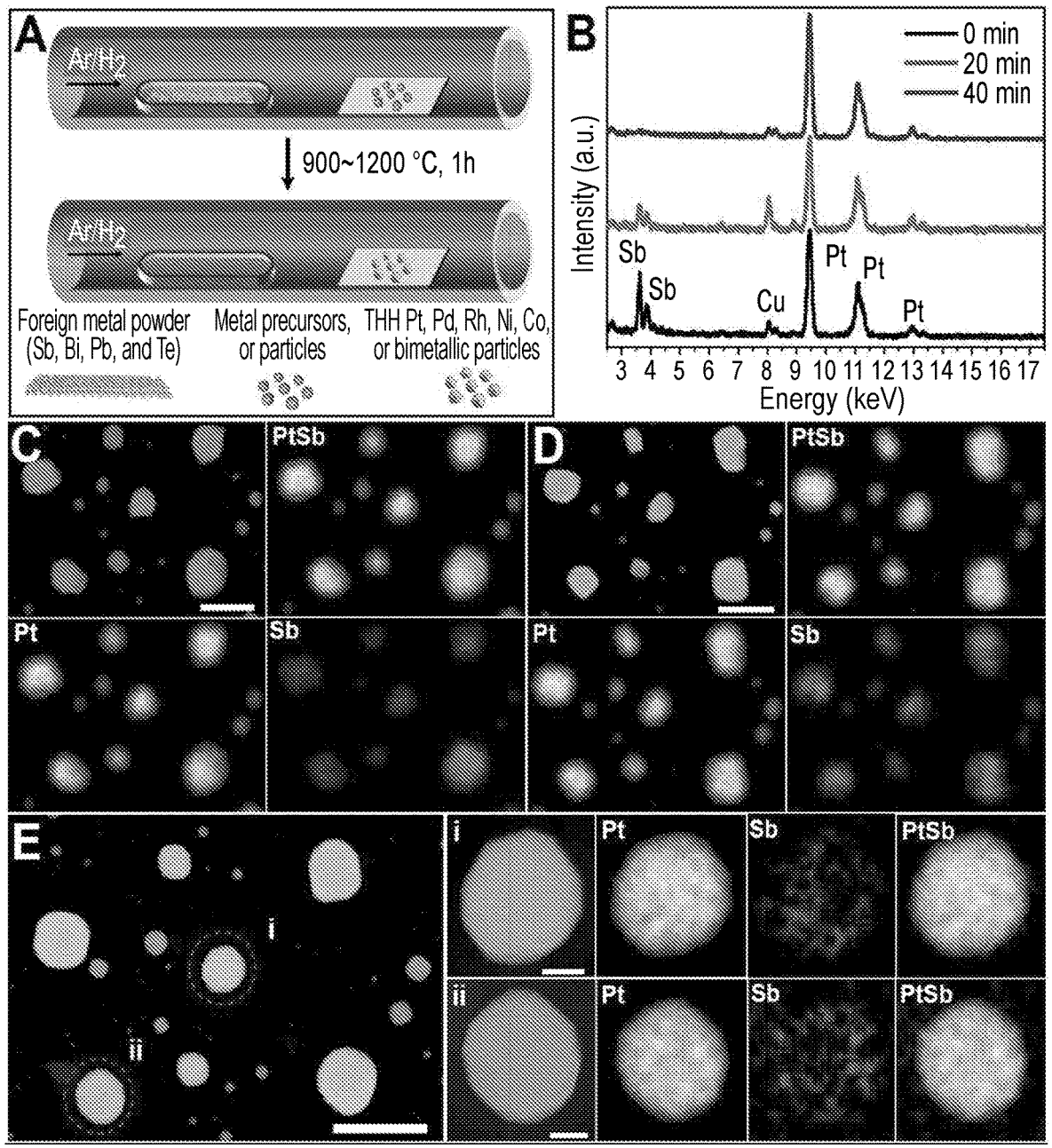
FIG. 1 shows the experimental setup and some experimental results for synthesizing THH particles through alloying/dealloying with foreign metals (Sb, Bi, Pb, and Te). (A) Scheme for synthesizing THH particles with a CVD setup. Approximately 1 mg of the foreign metal powder was loaded in a combustion boat, which was then transferred to a tube furnace. A silicon wafer coated with the metal salt precursors of interest or irregularly-shaped particles was placed in the tube, downstream from the foreign metal powder. After thermal treatment in an Ar (or $Ar/H_2$) atmosphere, the tube was quenched in air, and then cooled to room temperature. The foreign metal powder was completely transferred to the silicon wafer with metal precursors via evaporation and THH particles formed. (B) EDS spectra of the synthesized particles after reacting at 900° C. as a function of time. The Cu signals are from the TEM sample holder. STEM images and EDS elemental maps of the synthesized particles in the same area after reacting at 900° C. for: (C) 0 min (26% Pt, 74% Sb), (D) 20 min (38% Pt, 62% Sb), and (E) 40 min (85% Pt, <15% Sb). In (E), STEM images and corresponding EDS elemental maps (right) for the circled particles provide a clear view of particle morphology and elemental distribution. Scale bars in (i and ii) are 50 nm. The rest are 300 nm.

Provided herein are methods of preparing tetrahexahedra ("THH") nanoparticles from a mixture of metal particles heated in the presence of a foreign metal. In some cases, the method comprises heating particles comprising a first metal in the presence of a second metal at 800° C. to 1300° C. for about 30 minutes to about 120 minutes to form the THH nanoparticles; wherein the first metal comprises platinum, palladium, rhodium, nickel, cobalt, or a combination thereof and the second metal comprises Sb, Bi, Pb, Te, or a combination thereof. These methods can provide a one-step, ligand-free, generalizable method that can synthesize catalytically active THH nanoparticles on an industrial scale. These methods can also provide a method to recycle non-THH shaped nanoparticles, such as waste catalysts in the industry, and form catalytically active THH nanoparticles described herein.

The methods herein can be used to prepare tetrahexahedron (THH)-shaped Pt, Pd, Rh, Ni, Co, and bimetallic nanoparticles, regardless of foreign metal, after appropriate thermal treatment. In some cases, the methods provide THH-shaped PT, Pd, and Rh nanoparticles. Both density functional theory (DFT) and electron microscopy studies are used to determine why and how this process occurs.

The THH nanoparticles can be used as catalysts, e.g., in electrochemical oxidation reactions. For example, the THH nanoparticles can be used to oxidize, e.g., formic acid, to CO and/or $CO_2$. In some cases, the method comprises applying a current to a mixture of THH nanoparticles, $H_2SO_4$, and formic acid to form CO and/or $CO_2$. Sb-, Bi-, Pb-, and Te-modified THH-shaped nanoparticles were evaluated as electrocatalysts for formic acid oxidation and determined to be superior to commercial Pt/C catalysts, thereby providing a promising alternative that can become important in next-generation fuel cell development.

The use of the terms "a," "an," "the," and similar referents in the context of describing the disclosure herein (especially in the context of the claims) are to be construed to cover both the singular and the plural, unless otherwise indicated. Recitation of ranges of values herein merely are intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended to better illustrate the disclosure herein and is not a limitation on the scope of the invention unless otherwise claimed. No language in the specification should be construed as indicating any non-claimed element as essential to the practice of the disclosure herein. As used herein, the singular forms "a," "an," and "the" include plural referents unless the context clearly dictates otherwise. Thus, for example, the term "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

The practice of a method disclosed herein, and individual steps thereof, can be performed manually and/or with the aid of or automation provided by electronic equipment. Although processes have been described with reference to particular embodiments, a person of ordinary skill in the art will readily appreciate that other ways of performing the acts associated with the methods may be used. For example, the order of several of the steps may be changed without departing from the scope or spirit of the method, unless described otherwise. In addition, some of the individual steps can be combined, omitted, or further subdivided into additional steps.

Method of Preparing THH Nanoparticles

The THH nanoparticles herein can be prepared via heating particles comprising a first metal in the presence of a second metal at 500° C. to 1300° C. for about 0.5 hours to about 12 hours. The first metal can comprise platinum, palladium, rhodium, nickel, cobalt or a combination thereof. In some cases, the first metal can comprise Pt, Pd, Rh, or a combination thereof. In some cases, the first metal can be bimetallic. In embodiments, a bimetallic first metal can comprise Pt, Ni, Co, Cu, Pd, Au, Rh, or a combination thereof. For example, the bimetallic first metal can comprise PtNi, PtCo, PtCu, PdPt, PdAu, PdCo, PdCu, RhPt, RhCo, RhNi, or a combination thereof. The second metal can comprise Sb, Bi, Pb, Te, or a combination thereof.

Thermolysis of solid-state precursors are widely used techniques in industry for producing noble metal nanoparticles at scale (M. V. Twigg, *Catalyst handbook* (CRC, 1989)); however, the particles made via that method typically have low-index facets and thermodynamically favorable, catalytically non-ideal shapes (Barnard, *ACS Nano* 3, 1431-1436 (2009)). Underpotential deposition (Personick et al., *Nano Lett.* 11, 3394-3398 (2011)) of trace amounts of shape-regulating metal elements or the second metal as described herein can be used to synthesize high-index facet nanoparticles as described herein. The method herein is used to control anisotropic growth with trace amounts of foreign shape-regulating metal elements.

Figure 34:
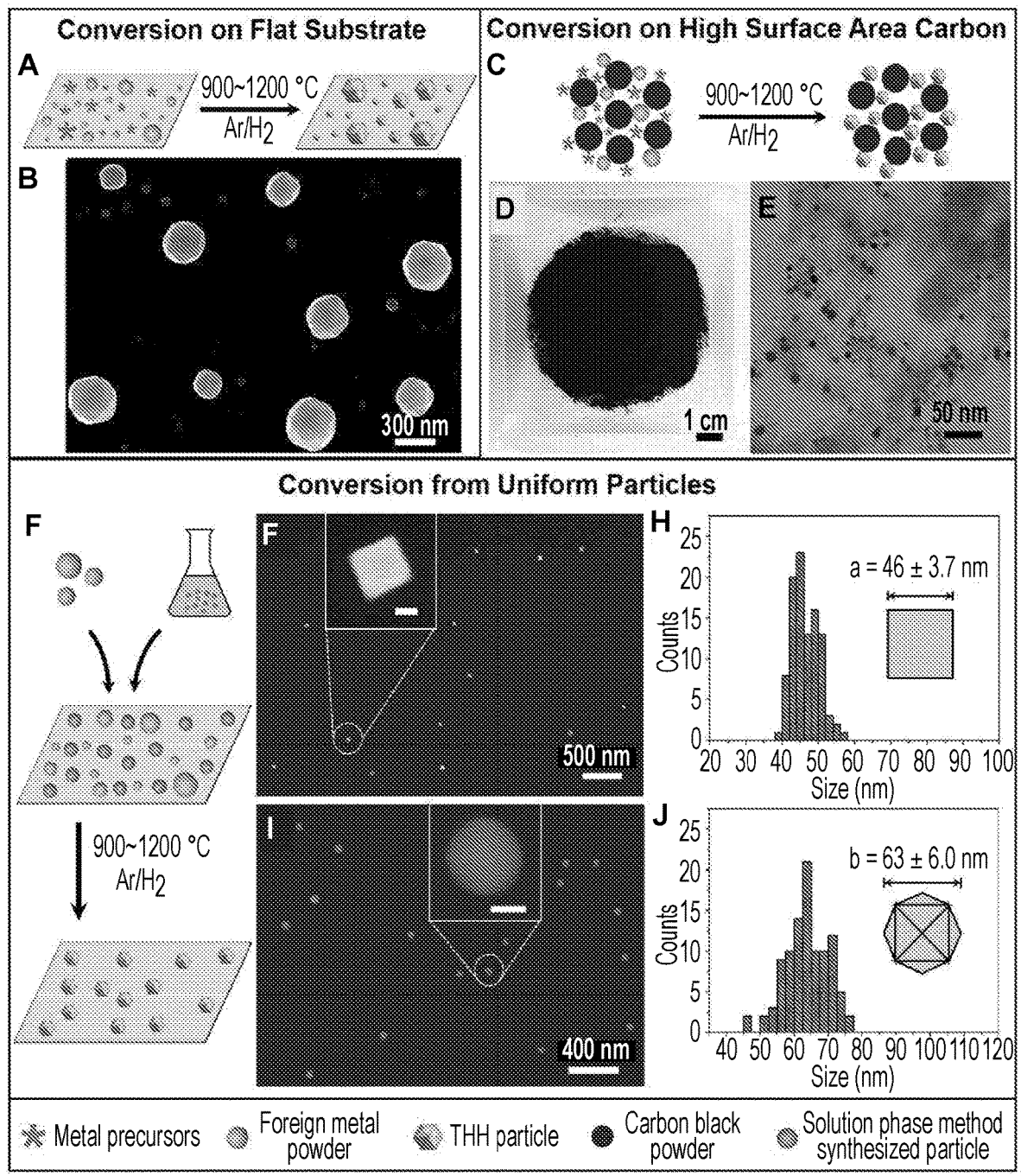
FIG. 34 shows alternative methods used for synthesizing THH particles. (A) Scheme for synthesizing THH particles by directly heating mixtures of foreign metal powder and metal precursors of interest on a silicon wafer. (B) An SEM image of THH Pt particles synthesized through Sb modification. (C) Scheme for preparing THH particles on high specific surface area carbon black powder by directly heating mixtures of foreign metal powder, metal precursors, and carbon black powder. (D) Photograph of ~1.3 g of THH Pt catalyst particles with Bi modification (20% Pt-loading on carbon XC-72). (E) A STEM image of the THH Pt particles on carbon black powder. (F) Scheme for producing monodisperse THH particles by directly heating foreign metal powders and pre-synthesized uniform particles on a silicon wafer. (G) A STEM image of the Pd nanocubes synthesized by the solution phase method. (H) Histogram showing the size distribution of the Pd nanocubes (sample size: 100). (I) A STEM image of Pd THH converted from the Pd nanocubes in (G). (J) Histogram showing the size distribution of the Pd THH particles (sample size: 100). The volume and dispersity of the Pd THH particles are similar to those of the initial Pd nanocubes. For nanocubes and {210} facet-enclosed THH particles with equal volumes, b=1.31*a. Scale bars for the inset images in (G) and (I) are 20 and 30 nm, respectively

In some cases, mixtures of the first metal precursors and second metal powders are heated on a silicon wafer (FIG. 34 in A). Upon reaction completion and subsequent cooling, the morphology of the resulting nanoparticles is THH and can be confirmed by scanning electron microscopy (SEM) (for example in FIG. 34 in B). The synthesis can be readily scaled to gram quantities (for example in FIG. 34, C and D) by replacing the flat wafer with typical catalyst supports with high specific surface areas (such as carbon black) that had strong interactions with the nanoparticles. In embodiments, this led to the as-synthesized THH particles being dramatically reduced in size from on average greater than about 200 nm to less than or equal to about 20 nm (for example in FIG. 34 in E). Although the THH particles converted directly from metal salt precursors can be, in embodiments, polydisperse in size (edge length along [100] direction: 206±144 nm, sample size: 100), monodisperse THH particles (edge length along [100] direction: 63±6.0 nm, sample size: 100) can be obtained by using monodisperse cube-shaped nanoparticles (edge length: 46±3.7 nm, sample size: 100) as starting materials and then transforming them with the same method into monodisperse THH particles (FIG. 34, in F to J).

Figure 2:
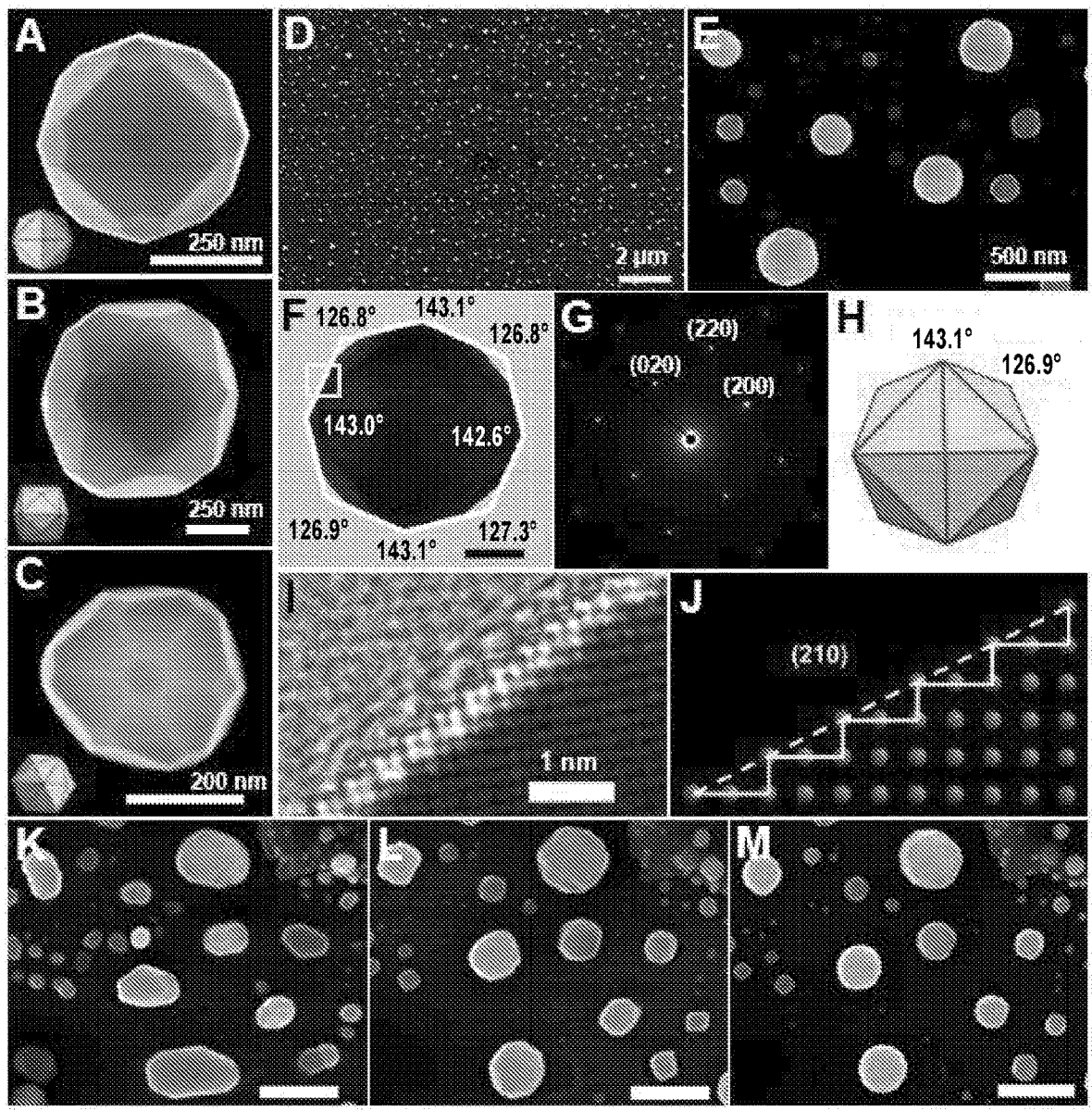
FIG. 2 shows in (A-C) Representative SEM images of truncated THH Pt particles observed from [100], [110] and [111] crystal orientations. (D-E) SEM images of Pt particles dispersed on the silicon wafer. (F) TEM image of a truncated THH Pt nanoparticle recorded along the [001] direction. White lines are used to highlight the facets of the nanoparticles as a guide to the eye. (G) Corresponding diffraction patterns of the nanoparticle in (F). (H) An ideal model of THH-shaped nanoparticle surrounded by {210} facets projected along the direction. A careful measurement of angles between surface planes of the nanoparticle in (F) indicates that the Miller indices of exposed high-index facets are {210}. (I) A HRTEM image recorded from the boxed area marked in (f). Red lines are drawn to highlight the surface (210) plane as a guide to the eye. (J) An atomic model of (210) plane. SEM images of Pt particles synthesized on a silicon wafer by, FIG. 2 in (K), particles were synthesized by thermally decomposing $H_2PtCl_6$ at 700° C. for 30 min without using Sb powder, in (L) particles were synthesized by heating the sample in (K) at 900° C. for 30 min using 1 mg Sb powder, and, in (M) particles were synthesized by heating the sample in (L) at 900° C. for 30 min without using Sb powder. Scale bars: 20 nm in (F) and 300 nm in (K to M).

To better understand the THH formation process, a chemical vapor deposition (CVD) chamber can be used in which the second metals were placed upstream of a tube furnace and were carried by argon/hydrogen flow to the first metal precursors upon thermal treatment (FIG. 1). The reactor can be used to determine the structural and morphological evolution of THH nanoparticles, such as Sb-modified Pt. The SEM images confirmed the high-yield (1000 out of 1000) formation of THH particles by CVD (FIG. 2, in A to E). The dominant exposed facets were high-index {210} planes, which were indexed by transmission electron microscopy (TEM) images and their corresponding selected area electron diffraction (SAED) patterns. An ideal THH model surrounded by {210} facets correlated well with the TEM imaged structures. A high-resolution TEM (HRTEM) image of the nanoparticles showed the atomic arrangement of the atoms on the (210) plane, which also correlated well with an atomic model of a (210) facet (FIG. 2, in F to J).

Figure 5:
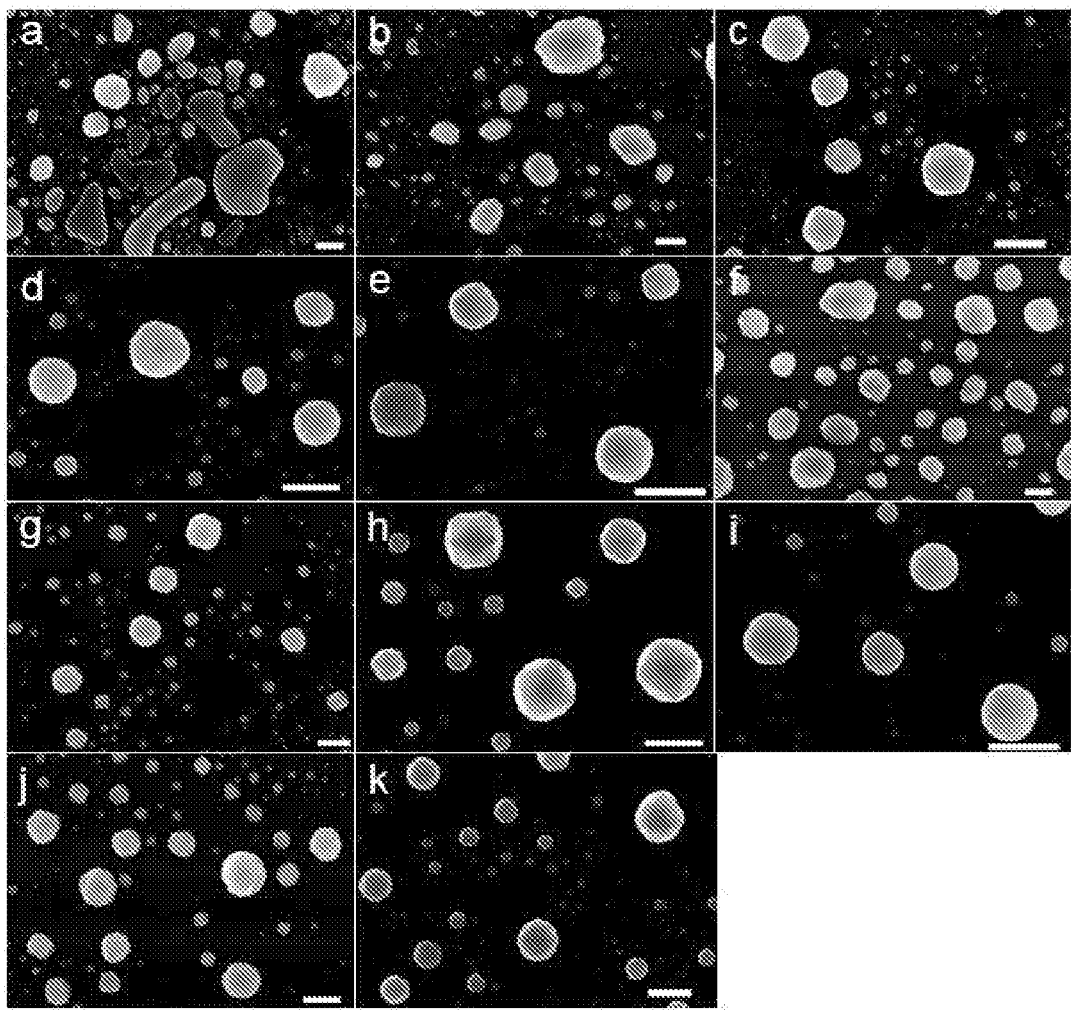
FIG. 5 shows SEM images of Pt particles synthesized with ~1 mg Sb powder as the source under different conditions: in (a) 600° C. for 12 h, (b) 800° C. for 0 min, (c) 800° C. for 30 min, (d) 800° C. for 1 h, (e) 800° C. for 12 h, (f) 900° C. for 0 min, (g) 900° C. for 30 min, (h) 900° C. for 1 h, (i) 900° C. for 4 h, (j) 1000° C. for 30 min, and (k) 1000° C. for 1 h. Scale bars: 500 nm.
Figure 6:
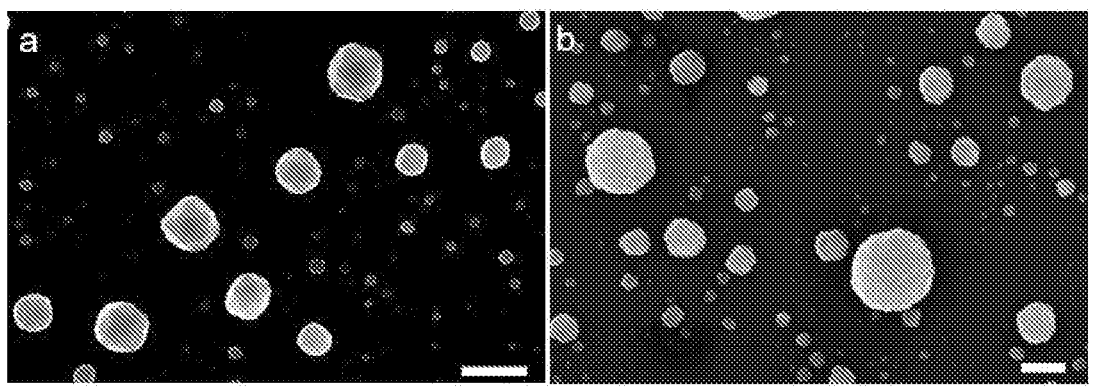
FIG. 6 shows SEM images of Pt particles synthesized at 900° C. in (a) 30 min with 0.1 mg Sb powder as the source, and (b) 1 h with 10 mg Sb powder supplied as the source every 30 min. Scale bars: 500 nm.
Figure 7:
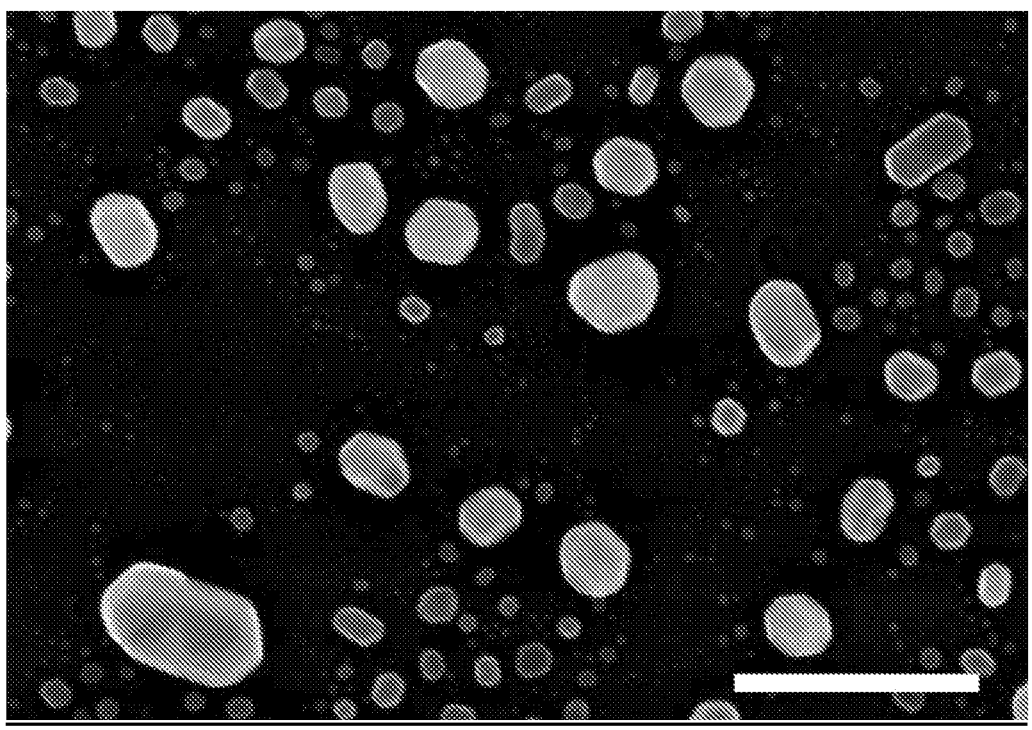
FIG. 7 shows SEM image of Pt nanoparticles synthesized on a silicon wafer by directly decomposing the Pt precursor without the addition of Sb. Scale bar: 500 nm.
Figure 8:
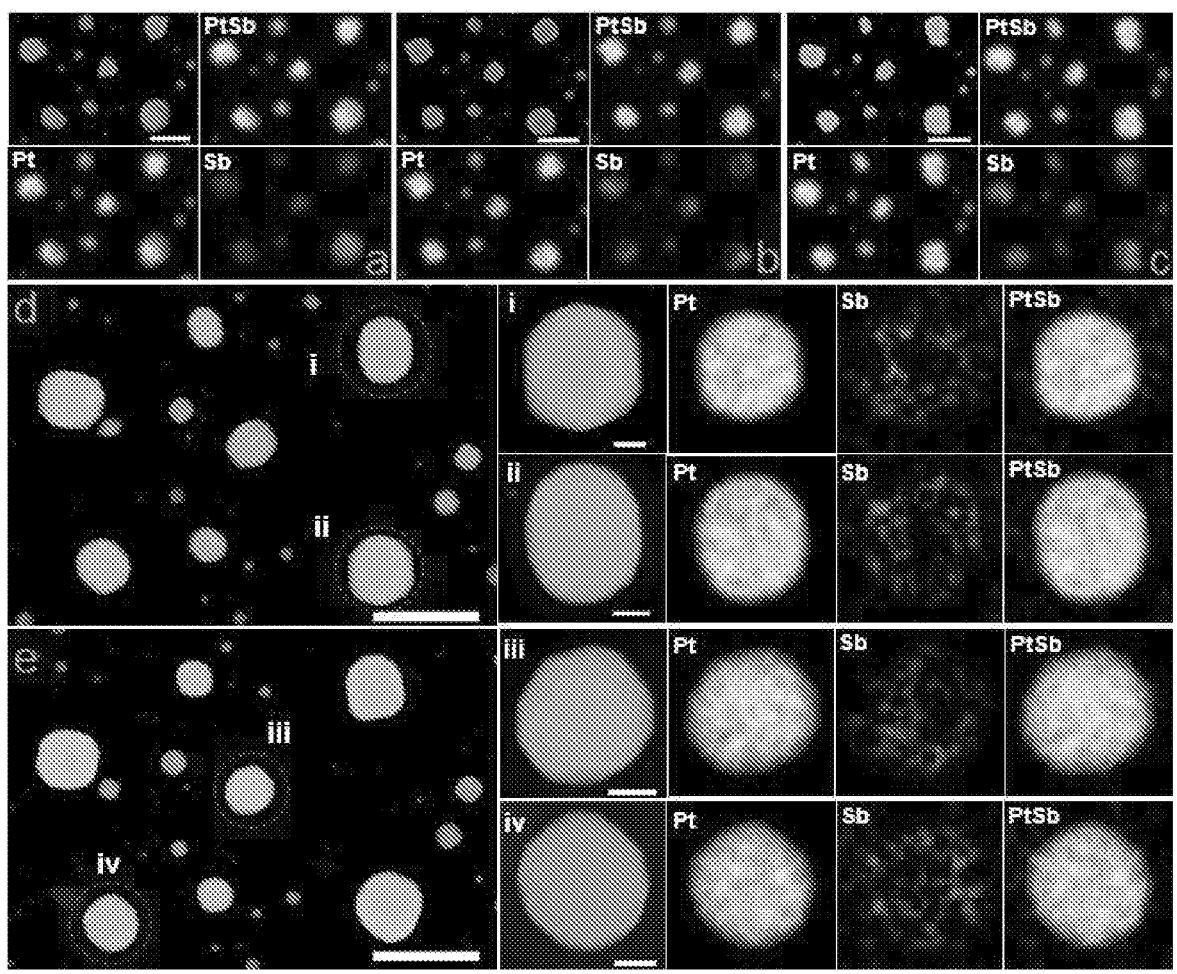
FIG. 8 shows STEM images and EDS elemental maps of the synthesized particles after reacting at 900° C. in (a) 0 min (26% Pt, 74% Sb), (b) 10 min (32% Pt, 68% Sb), (c) 20 min (38% Pt, 62% Sb), (d) 30 min (69% Pt, 31% Sb) and (e) 40 min (85% Pt, 15% Sb) with 1 mg Sb powder being used as the source. In Fig. (d) and (e), STEM images and corresponding EDS maps are shown on the right for the circled particles to get a clear view of the morphology and elemental distribution. Scale bars in (i-iv) are 50 nm. The rest are 300 nm.
Figure 9:
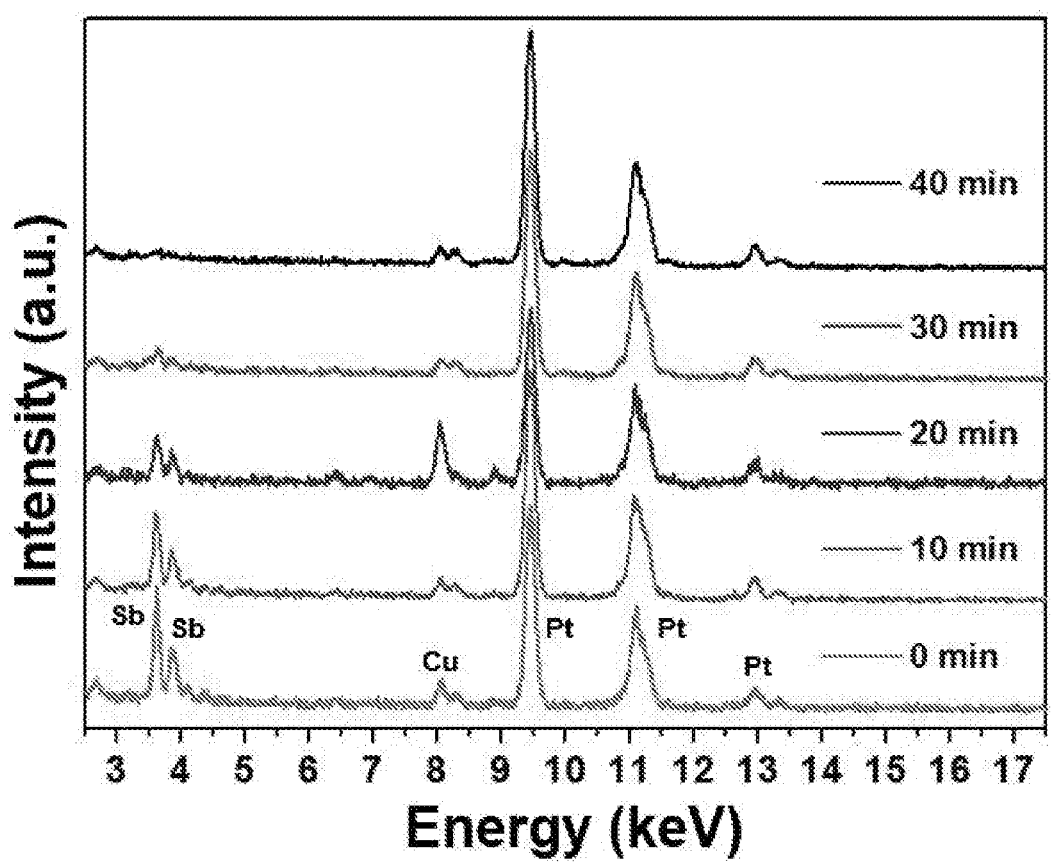
FIG. 9 shows EDS spectra of the particles synthesized at 900° C. after in (a) 0 min (26% Pt, 74% Sb), (b) 10 min (32% Pt, 68% Sb), (c) 20 min (38% Pt, 62% Sb), (d) 30 min (69% Pt, 31% Sb) and (e) 40 min (85% Pt, 15% Sb).
Figure 10:
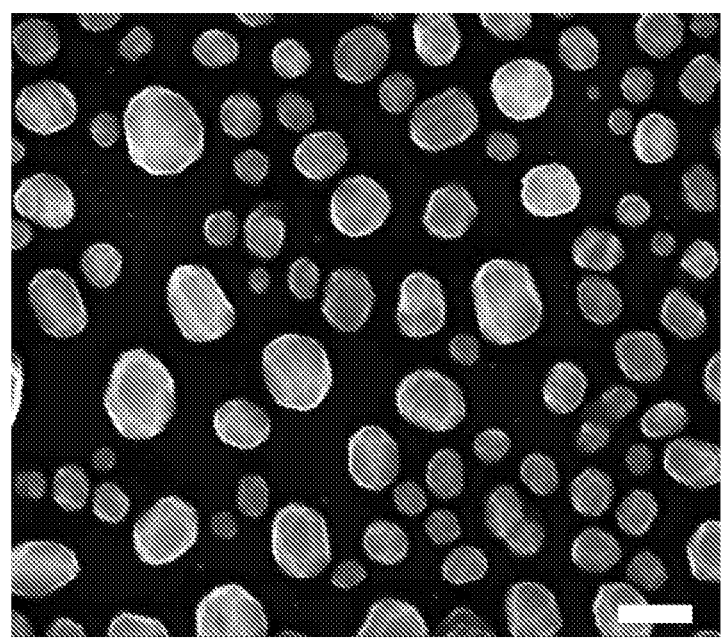
FIG. 10 shows SEM image of Pt particles synthesized with 1 mg Bi powder source by heating the silicon wafer spin-coated with aqueous solutions of $H_2PtCl_6$ to 800° C. with a ramping rate of 10° C./min, followed by quenching the tube in ice cold water. Scale bar: 200 nm.
Figure 11:
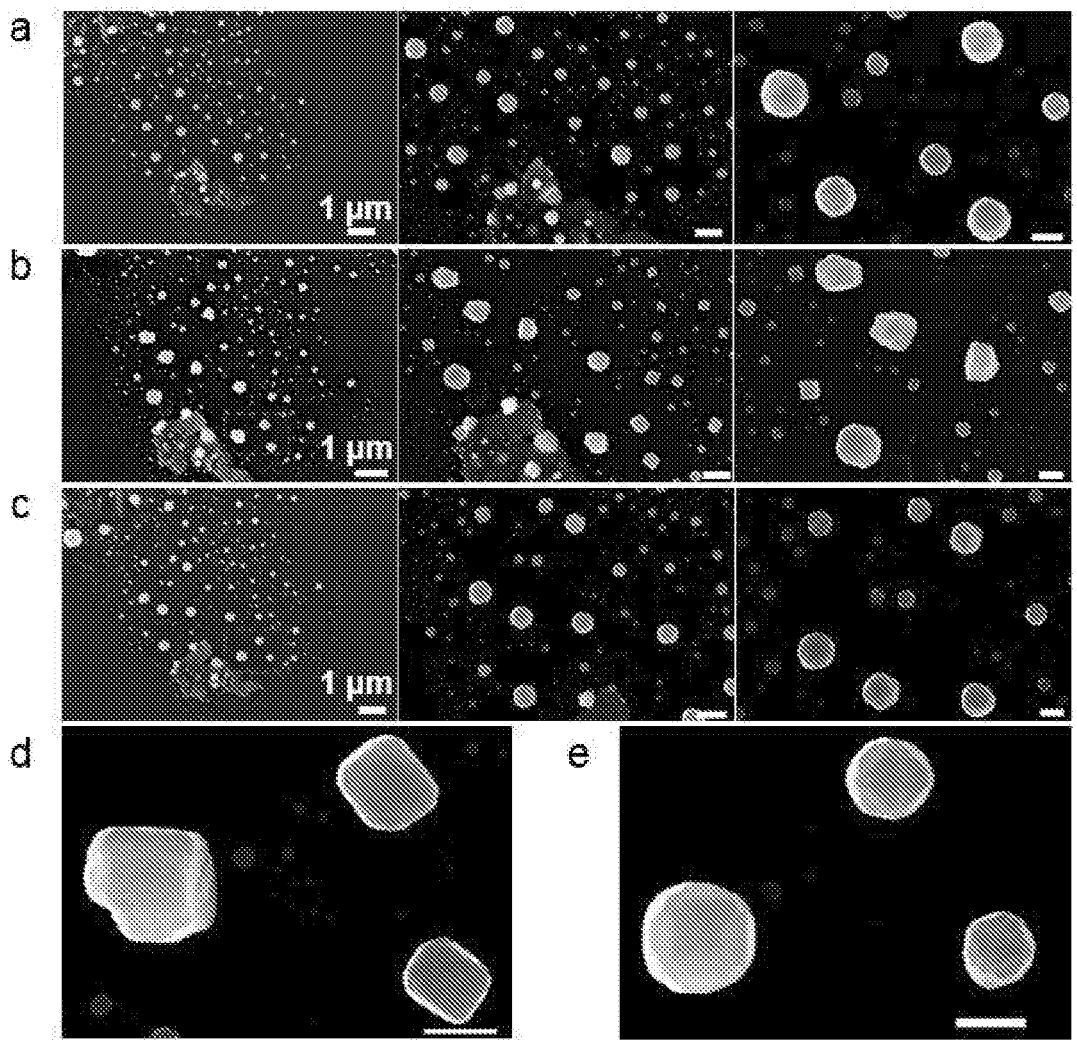
FIG. 11 shows SEM images of in (a) as-synthesized truncated THH Pt particles on a silicon wafer, (b) Pt particles synthesized after annealing the sample (a) at 900° C. for 30 min with 1 mg Sb powder source and (c) truncated THH Pt nanoparticles synthesized after annealing the sample (b) at 900° C. for 30 min without Sb powder source. Each column is a magnified view of the former column. (d) and (e) are magnified view of the boxed area in (b) and (c) respectively. Scale bars: 500 nm (second column) and 250 nm (third column) in (a-c), 250 nm in (d-e).
Figure 12:
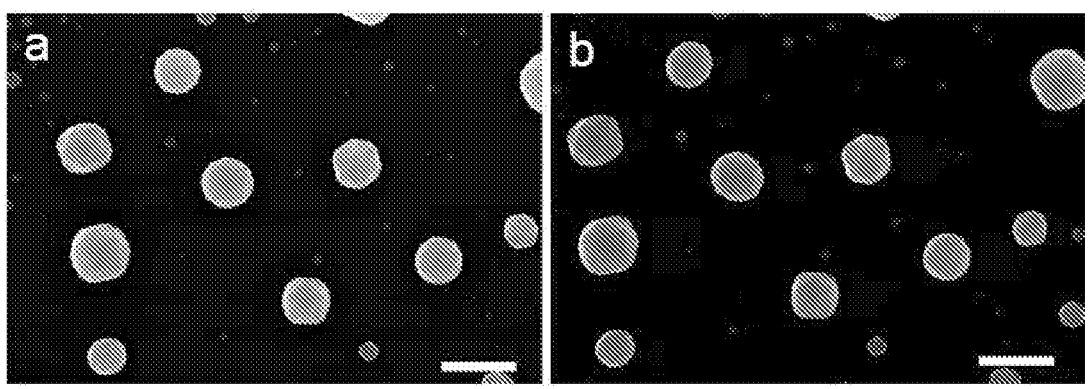
FIG. 12 shows SEM images of in (a) as-synthesized THH-shaped Pt nanoparticles and (b) after being annealed at 900° C. for 30 min without using extra Sb powder source. The particle shape remains intact after the annealing treatment. Scale bars: 500 nm.

Reaction temperature, time, and amount of Sb powder were systematically explored to determine their relative importance (FIGS. 5-10). Higher temperatures lead to more rapid THH-shaped particle formation, but also to a decreased time window for generating high quality THH. At higher temperatures, Sb dealloying occurs at a faster rate, and temperature equal to or above 900° C. is required to produce THH-shaped Pt particles with smooth surfaces. Interestingly, when larger amounts of Sb are used, the formation of THH shape is delayed, since it takes longer for the dealloying process to occur (FIG. 7). Indeed, scanning transmission electron microscopy (STEM) and energy-dispersive X-ray spectroscopy (EDS) support this conclusion (FIG. 1 in B to E and FIGS. 8-9). Specifically, the two techniques show that THH-shaped Pt particles form as the Sb is removed from the initial Sb rich Pt—Sb alloy particles. This novel alloying/dealloying shape-regulating process is distinct from the classical additive-growth process that defines conventional wet chemistry methods. Finally, if one starts with THH particles and uses the same setup to transfer Sb to them, the alloying process results in irregular shaped particles, showing that the Sb dealloying process is critical for generating the near-perfect THH particles (FIGS. 11-12).

Figure 13:
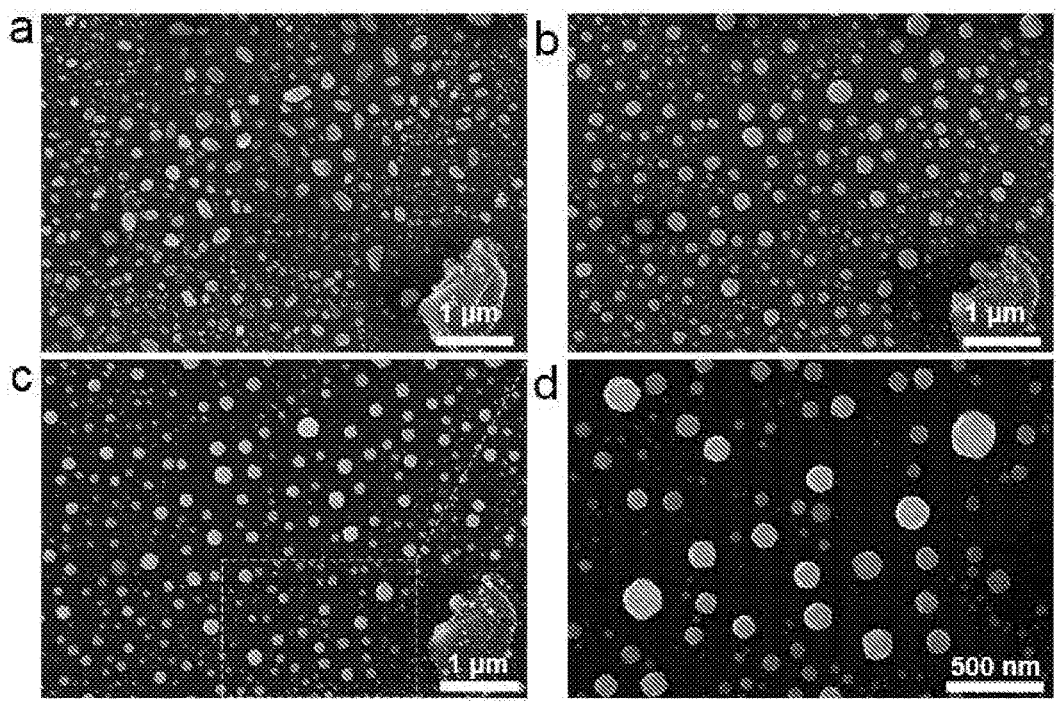
FIG. 13 shows SEM images of in (a) as-synthesized Pt particles by directly annealing a silicon wafer which was spin coated with an aqueous solution of $H_2PtCl_6$ at 700° C. for 30 min without using any external Sb powder source, (b) Pt particles synthesized by annealing the sample (a) at 900° C. for 30 min with 1 mg Sb powder source, and (c) truncated THH Pt particles synthesized by annealing the sample (b) at 900° C. for 30 min without Sb powder source. (d) is a magnified view of the boxed area in (c). The silica residue at the bottom right of each figure was used as a position reference for the particles.
Figure 14:
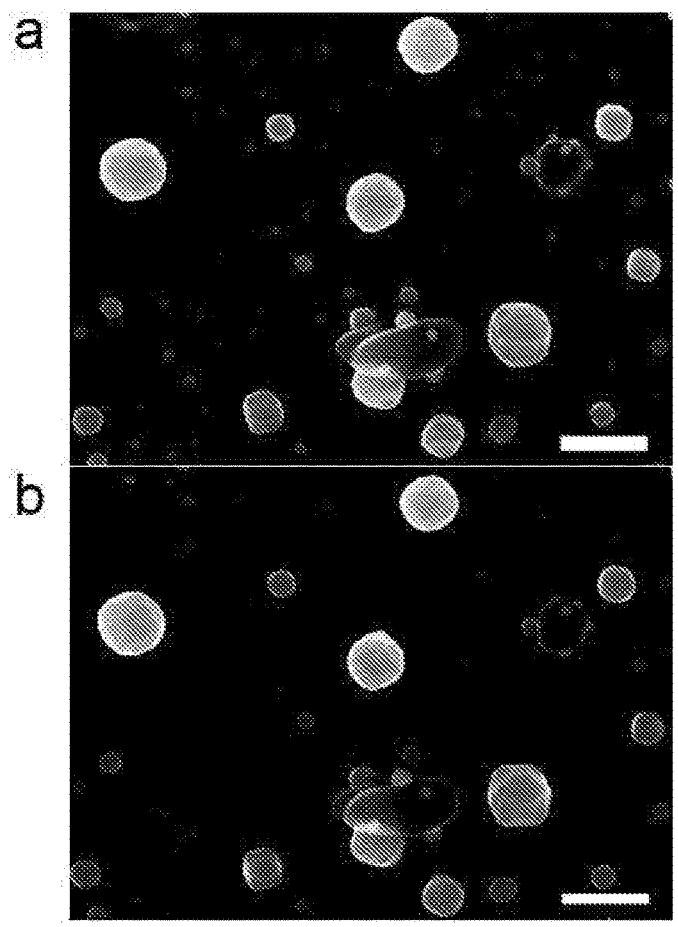
FIG. 14 shows SEM image of in (a) Pt particles synthesized by heating the precursor at 900° C. for 1 h with 1 mg Sb powder as the source, followed by slow cooling the tube to room temperature with a speed of 5° C./min, and (b) Pt particles with smooth surfaces by reheating the sample at 900° C. for 30 min without using external Sb powder. Scale bar: 500 nm.
Figure 15:
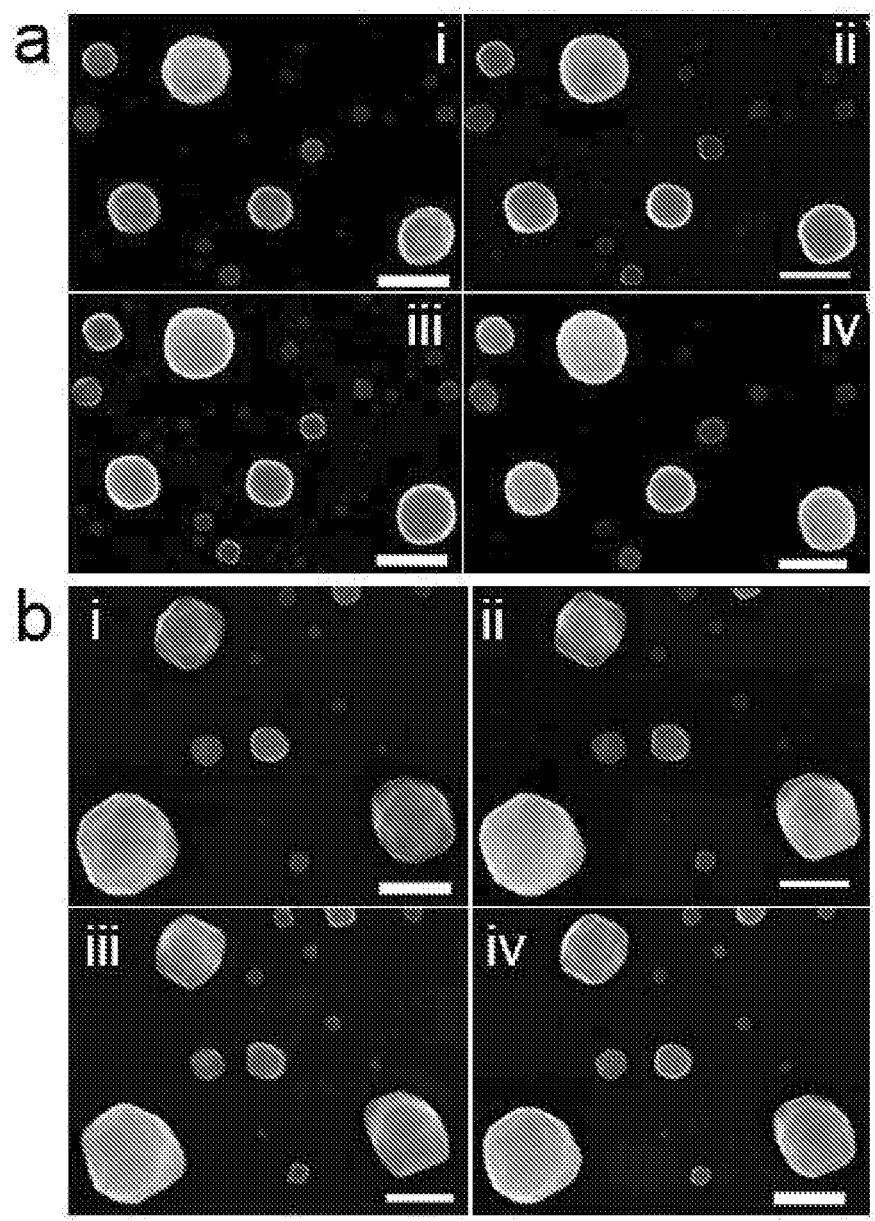
FIG. 15 shows SEM images of Pt particles under thermal annealing at 600° C. for different time durations: (i) 0 min, (ii) 2 h, and (iii) 12 h. (iv) in (a) and (b) are the SEM images of the same particles after being annealing at 900° C. for 30 min without using extra Sb powder source. Scale bars: 300 nm.
Figure 16:
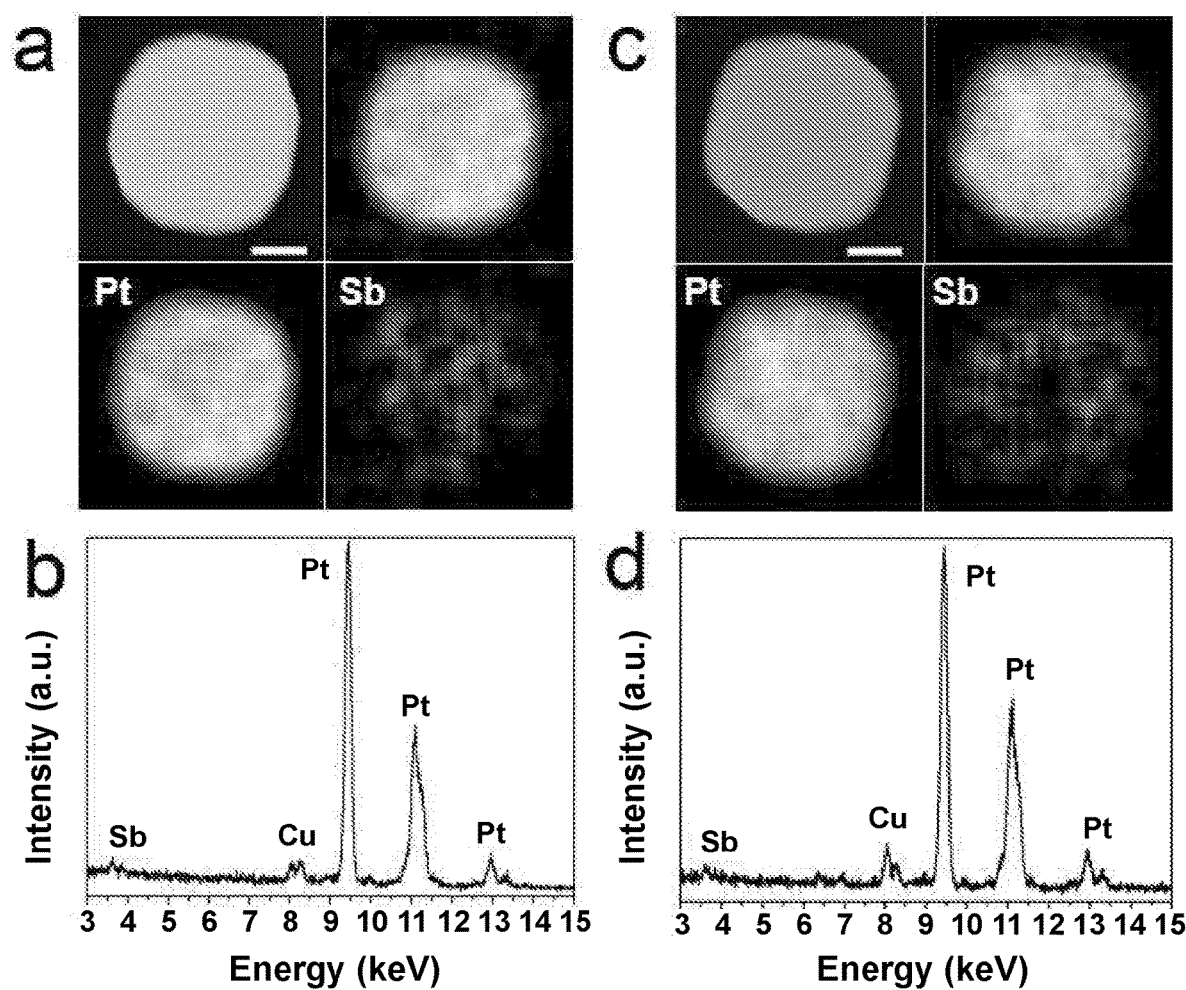
FIG. 16 shows STEM images, EDS elemental maps and corresponding spectra for the THH-shaped particles (in a,b) as-synthesized and (in c,d) after 12-h thermal annealing at 600° C. The atomic composition of the particle was $Pt_{76}Sb_{24}$ for (in a, b) and $Pt_{73}Sb_{21}$ for (in c, d). The Cu signals are from the TEM sample holder. Scale bars: 50 nm.

Because the alloying and dealloying of Pt nanoparticles with Sb vapor both proceeded independently of the initial nanoparticle shape, the method can be used as an effective method for recycling ill-shaped Pt waste catalysts, an important industrial concern for the wide-scale application of noble metal catalysts. In embodiments, Pt nanoparticles can be synthesized on a silicon wafer by thermally decomposing $H_2PtCl_6$ at 700° C. (FIG. 2 in K and FIG. 13 in A). The resulting nanoparticles exhibited irregular shapes, similar to the random shapes observed with waste catalysts, thereby establishing a model system for testing the shape-repairing capability of the alloying-dealloying process. In embodiments, samples can be then heated to 900° C. for 30 min with 1 mg of Sb as the second metal source. The resulting Pt—Sb alloy nanoparticle exhibited primarily low-index cubic shapes (FIG. 2 in L and FIG. 13 in B). The Sb source is removed, and the nanoparticles were further heated at 900° C. for another 30 min. The SEM images (FIG. 2 in M and FIG. 13 in C and D) of the resulting nanoparticles confirmed that >99% of them exhibited a truncated THH morphology, showing that the method herein can be useful for reestablishing the catalytically important THH particles from catalysts that have been deactivated. After completion of the heat treatment, the THH nanoparticles were quenched to room temperature by removing the tube containing them from the furnace. If instead, slow cooling is used, THH nanoparticles with rough surfaces were obtained as opposed to the particles with smooth surfaces that result from quenching (FIG. 14). The smooth surfaces can be stabilized with Sb in the high-index planes, and when heated at temperatures below 900° C., they were not stable and restructure into facets with nanoscopic terrace-and-step structures. Indeed, if high-quality THH structures were annealed at 600° C. for 12 hours, the process could be visualized by electron microscopy (FIGS. 15 and 16). The smooth {210} facets could be regenerated by reheating the particles at 900° C., which initiated the Sb-dealloying process (FIGS. 14 and 15). This reversible surface reconstruction of the first metal {210} facets, such as Pt, caused by the internal redistribution of Sb, is a new type of shape-recovery process.

Figure 3:
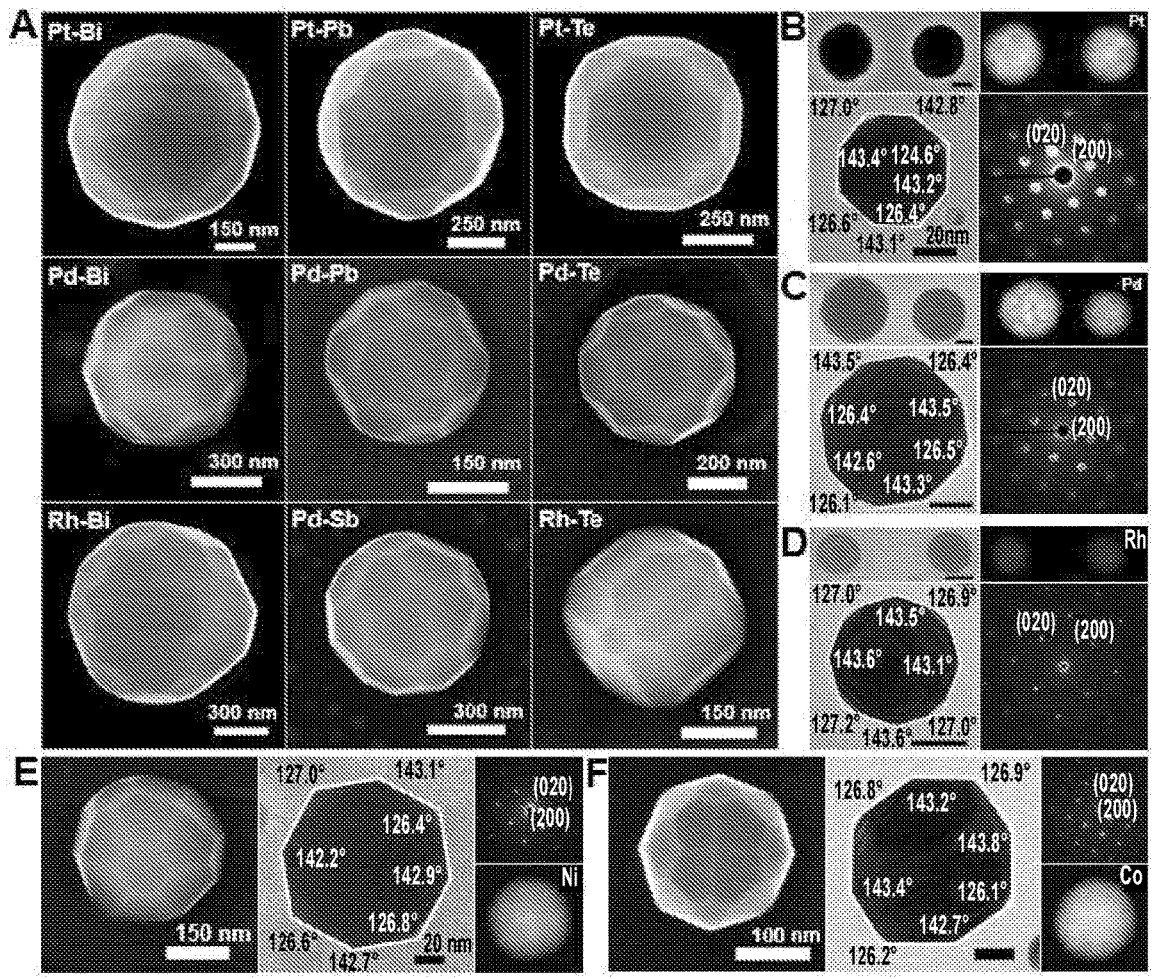
FIG. 3 shows in (A) SEM images of Pt, Pd and Rh particles synthesized through Sb, Bi, Pb and Te modification. STEM images, EDS elemental maps, TEM images and corresponding diffraction patterns of the Pt particles FIG. 3 in (B), Pd particles in (C) and Rh particles in (D), through Bi modification. SEM images, TEM images, corresponding diffraction patterns, and EDS elemental maps of the Ni particles FIG. 3 in (E), and Co particles in (F), through Bi modification are shown. Scale bars: 50 nm unless otherwise noted.
Figure 17:
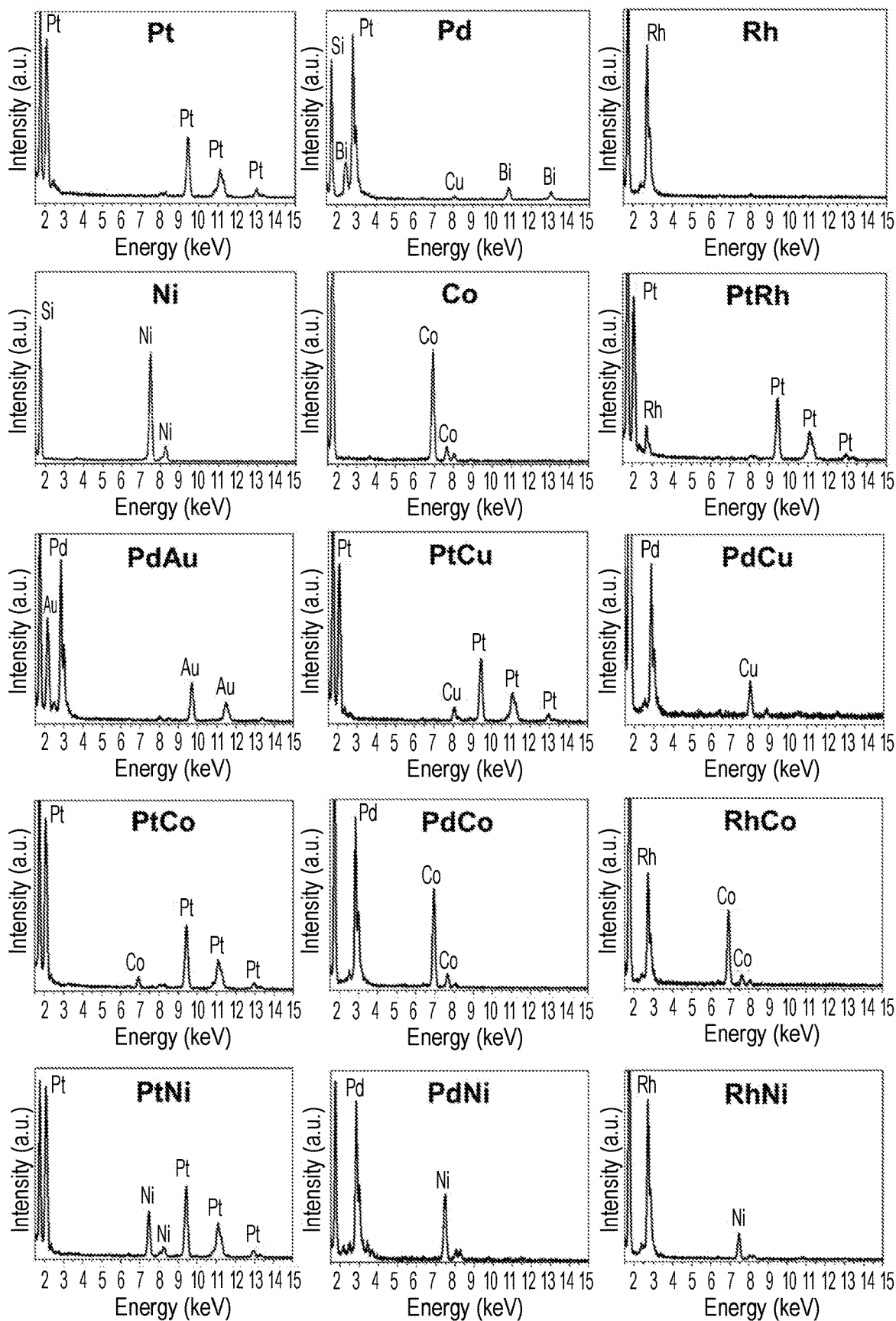
FIG. 17 shows EDS spectra of Pt, Pd, Rh, Ni, Co, and a library of bimetallic nanoparticles (PtRh, PdAu, PtCu, PdCu, PtCo, PdCo, RhCo, PtNi, PdNi, and RhNi) synthesized through Bi modification.
Figure 18:
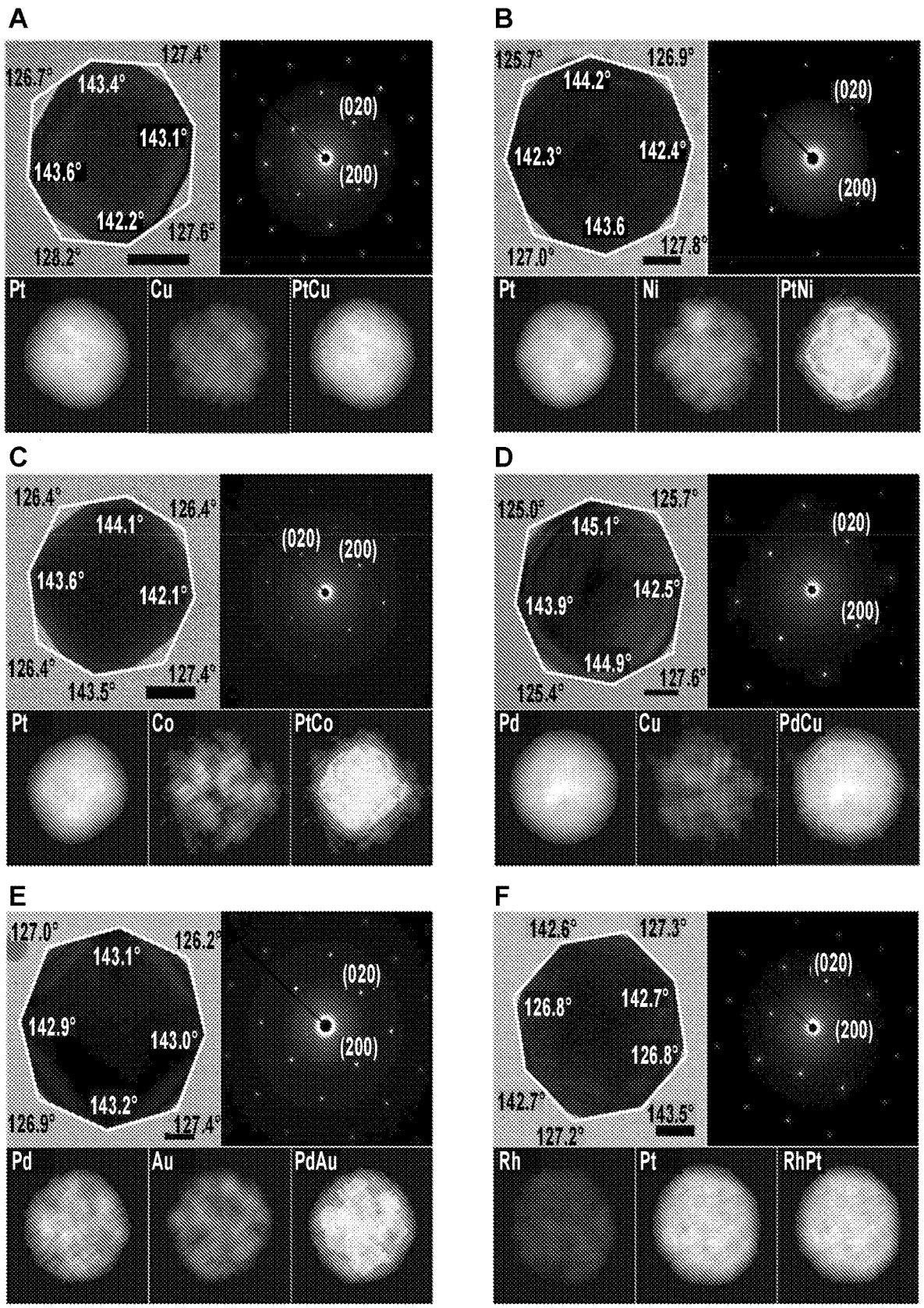
FIG. 18 shows TEM images, corresponding diffraction patterns, and EDS elemental maps for THH-shaped (A) PtCu, (B) PtNi, (C) PtCo, (D) PdCu, (E) PdAu, and (F) RhPt nanoparticles. The white lines are used to highlight the particle facets as a guide to the eye. Scale bars: 20 nm.
Figure 33:
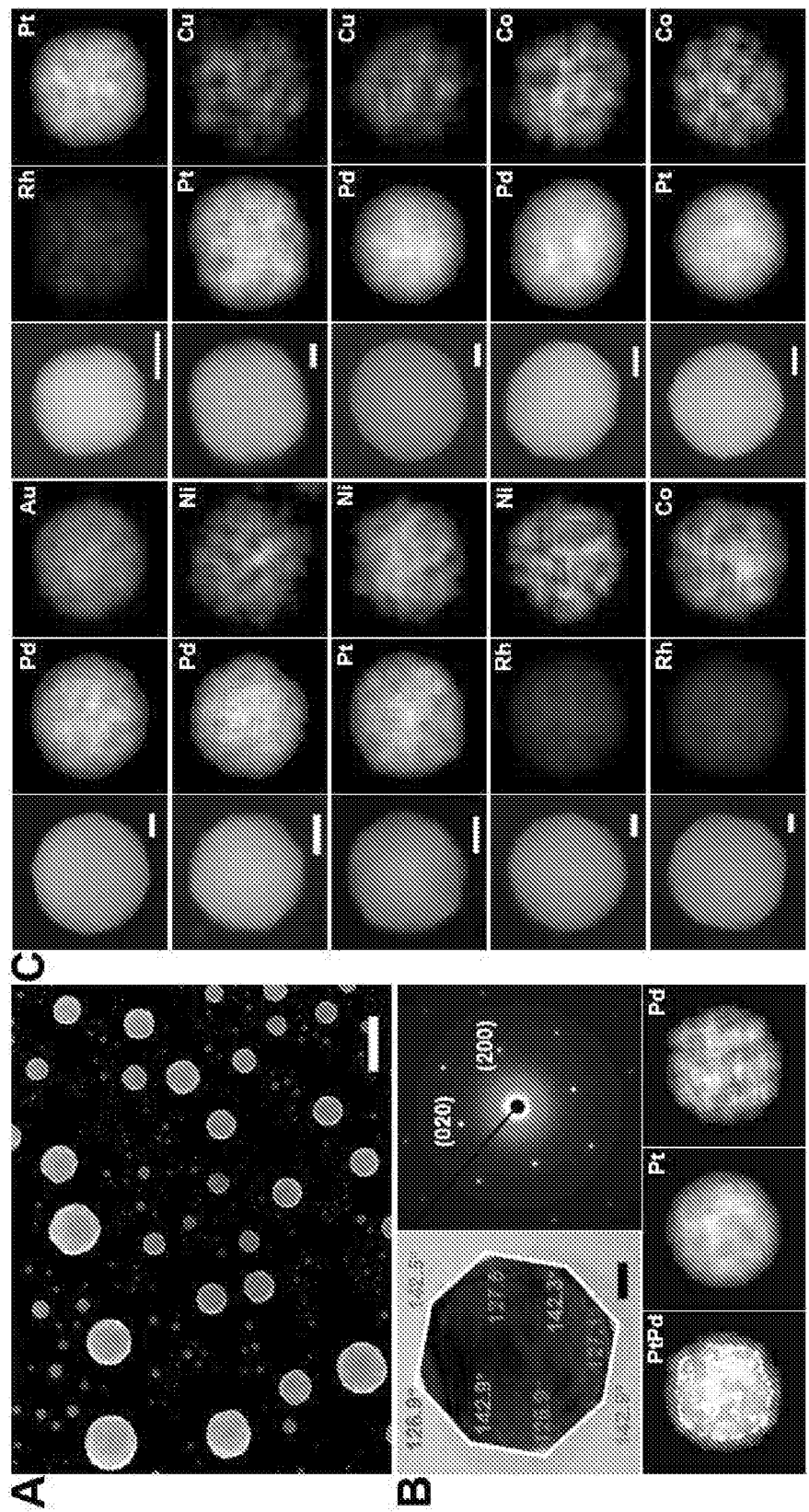
FIG. 33 shows THH-shaped bimetallic particles synthesized through Bi modification.

In addition to Sb, the trace elements, Bi, Pb, and Te, can also induce the formation of truncated THH-shaped Pt nanoparticles (FIG. 3 in A). This strategy proved useful for synthesizing THH-shaped nanoparticles of the noble metals Pd and Rh, as well as Ni and Co, where shape control has not been previously reported (FIG. 3 and FIG. 17). The Miller indices of the exposed planes for these particles were confirmed to be {210}, which are the same as those of the Sb-modified Pt THH-shaped nanoparticles. The generalizability of this method was further demonstrated by synthesizing a library of bimetallic nanoparticles through Bi modification (FIG. 33 and FIGS. 17 and 18).

For Pt nanoparticles with a fcc structure, the specific surface energies (on a per area basis) of the different crystal facets are rank ordered: $\sigma_{(111)} < \sigma_{(100)} < \sigma_{(110)} < \sigma_{(210)}$ (Zhang et al., *Appl. Surf. Sci.* 229, 34-42 (2004)), and the equilibrium shape for single crystalline Pt particles is a truncated octahedron. The predominant existence of the {210} facets in the synthesized Pt particles indicates that Sb modification stabilizes the {210} facets by reducing their specific surface energy. X-ray diffraction data (FIG. 19) prove that the atomic ordering of the Pt and Sb within the particles cannot be the reason for the formation of the THH-shaped Pt particles. Indeed, a time course study shows that the intermetallic phase ($Pt_3Sb$) particles formed at earlier time points do not take on the THH morphology. It is only until the vast majority of the Sb is removed and the bulk is pure Pt, that the THH morphology is observed. Thus, it can be concluded that the Sb modification in such particles is primarily on the surface. To test this hypothesis, DFT was used to calculate the specific surface energies of the (210) plane, the three low-index facets (100), (111) and (110) and different types of high-index planes after Sb modification (FIGS. 20-25, Tables 1-4). Importantly, the computational results confirmed that the specific surface energies of these facets changed dramatically after Sb modification, and the specific surface energy of Pt (210)-Sb was the lowest among the considered facets, consistent with the conclusion that Sb at the surface of the particles is playing a central role in stabilizing the THH morphology.

In various embodiments, the method of preparing THH nanoparticles can comprise THH nanoparticles with any high-index facets. In some cases, the method of preparing THH nanoparticles can comprise THH nanoparticles comprising {210} facets, {310} facets, a vicinal plane thereof or a combination thereof.

In embodiments, the first metal can comprise any noble metal suitable to one of skill in the art. In embodiments, the first metal can comprise Pt, Pd, Rh, Ni, Co, or a combination thereof, or the first metal can be bimetallic. In embodiments, the first metal can comprise Pt, Pd, Rh, or a combination thereof. In embodiments, a bimetallic first metal can comprise Pt, Ni, Co, Cu, Pd, Au, Rh, or a combination thereof. For example, the bimetallic first metal can comprise PtNi, PtCo, PtCu, PdPt, PdAu, PdCo, PdCu, RhPt, RhCo, RhNi, or a combination thereof. In embodiments, the first metal can comprise platinum. In embodiments, the method of preparing THH nanoparticles can comprise particles formed by the decomposition and/or reduction of a salt of the first metal or the particles are formed from a metal alloy of the first metal. In embodiments, the method of preparing THH nanoparticles can comprise particles formed by decomposition and/or reduction of $H_2PtCl_6 \cdot 6H_2O$, $Na_2PdCl_4$, $Na_3RhCl_6$, $Ni(NO_3)_2 \cdot 6H_2O$, $Co(NO_3)_2 \cdot 6H_2O$, $Cu(NO_3)_2 \cdot xH_2O$ wherein x is 1 to 10, $HAuCl_4 \cdot 3H_2O$, or a combination thereof. In embodiments, the method of preparing THH nanoparticles can comprise particles formed by decomposition and/or reduction of $H_2PtCl_6 \cdot 6H_2O$, $Na_2PdCl_4$, $Na_3RhCl_6$, or a combination thereof.

In embodiments, the method of preparing THH nanoparticles can comprise a second metal, wherein the second metal is any shape-directing metal suitable to one of skill in the art. The term "shape-directing" is described herein and further described in Personick et al. *Nano Lett.* 11, 3394-3398 (2011). In some cases, the second metal can comprise Bi, Pb, Sb, Te, or a combination thereof. In some embodiments, the second metal can comprise Bi. In some cases, the second metal can comprise Sb. In some cases, the method of preparing THH nanoparticles can comprise a second metal formed by the decomposition and/or reduction of a salt of the second metal. In embodiments, the second metal is present in an amount relative to the total amount of starting first metal particles and starting second metal. For example, the second metal can be present in an amount of 0.01 wt % to 25 wt %, relative to the total amount of first metal particles and second metal used. In embodiments, the second metal can be present in an amount of 0.01 wt % to 15 wt %, or 0.01 wt % to 10 wt %, or 0.01 wt % to 5 wt % or 0.01 wt % to 1 wt %, such as 0.1 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt %.

Since the alloying and dealloying of the particles with a second metal vapor are independent of initial particle shape, the method herein can be used as an effective method for recycling non-THH ("irregularly shaped") first metal nanoparticles ("waste catalysts"), an important industrial concern for the wide-scale application of noble metal catalysts (Morgan et al., *ACS Catal.* 5, 3430-3445 (2015)). In embodiments, Pt particles were synthesized on a Si wafer by thermally decomposing $H_2PtCl_6$ at 700° C. (FIG. 13 in a). The resulting particles exhibited irregular shapes, similar to the random shapes observed with waste catalysts, thereby establishing a model system for testing the shape-repairing capability of the alloying/dealloying process. Therefore, the sample was heated to 900° C. for 30 min with 1 mg of Sb as the foreign metal source. The resulting Sb—Pt alloy particles exhibited primarily low-index cubic shapes (FIG.

13 in b). The Sb source was removed, and the particles were further heated at 900° C. for another 30 min. The SEM images (FIG. 13, in c-d) of the resulting particles confirmed that essentially all of them exhibited a truncated THH morphology, confirming that this method may be useful for re-establishing the catalytically important THH particles from catalysts that have been deactivated.

In embodiments, upon completion of the heat treatment, the particles were quenched to room temperature by removing the tube containing them from the furnace. If instead, slow cooling is used, THH particles with rough surfaces are obtained as opposed to the particles with smooth surfaces that result from quenching (FIG. 14). The smooth surfaces are stabilized with Sb in the high-index planes, and when heated at temperatures below 900° C., they are not stable and restructure into facets with nanoscopic terrace-and-step structures. Indeed, if high quality THH structures are annealed at 600° C. for 12 h, this process can be clearly visualized by electron microscopy (FIGS. 15-16). The smooth {210} facets can be regenerated by reheating the same particles at 900° C., which initiates the Sb-dealloying process (FIGS. 14-15). This reversible surface reconstruction of Pt {210} facets, caused by the internal redistribution of Sb is a shape recovery process.

In embodiments, the method of preparing THH nanoparticles can be performed in a reactor wherein the second metal is oriented upstream of the particles and carried to the particles via a gas flow. The gas described herein can be any suitable gas to one of skill in the art. In embodiments, the gas can comprise argon, nitrogen, helium, hydrogen, carbon monoxide, carbon dioxide, or a combination thereof.

In embodiments, the particles comprising the first metal can be incorporated onto a support. The support described herein can be any support suitable to one of skill in the art. In embodiments, the support can comprise any oxide suitable to one of skill in the art. In embodiments, the support can comprise silica, titania, ceria, alumina, zirconia, niobium oxide, zinc oxide, iron oxide, vanadium oxide, or a combination thereof. In some cases, the support can be conductive. In embodiments, the conductive support can comprise carbon. In embodiments, the conductive support can comprise carbon black, graphene, graphite, carbon nanotube, carbon fiber, tungsten carbide, or a combination thereof.

In embodiments, the method of preparing THH nanoparticles can be performed in the absence of any ligand suitable to one of skill in the art. In embodiments, the method of preparing THH nanoparticles can be performed in the absence of an organic ligand.

Oxidizing Catalyst

Provided herein is a method of using the THH nanoparticles described herein as an oxidative catalyst. In embodiments, the THH nanoparticles described herein can catalyze the oxidation of a suitable small molecules suitable, such as formic acid, methanol, ethanol, carbon monoxide, or ammonium. In embodiments, the THH nanoparticles described herein can catalyze the oxidation of formic acid to CO and/or $CO_2$.

Figure 4:
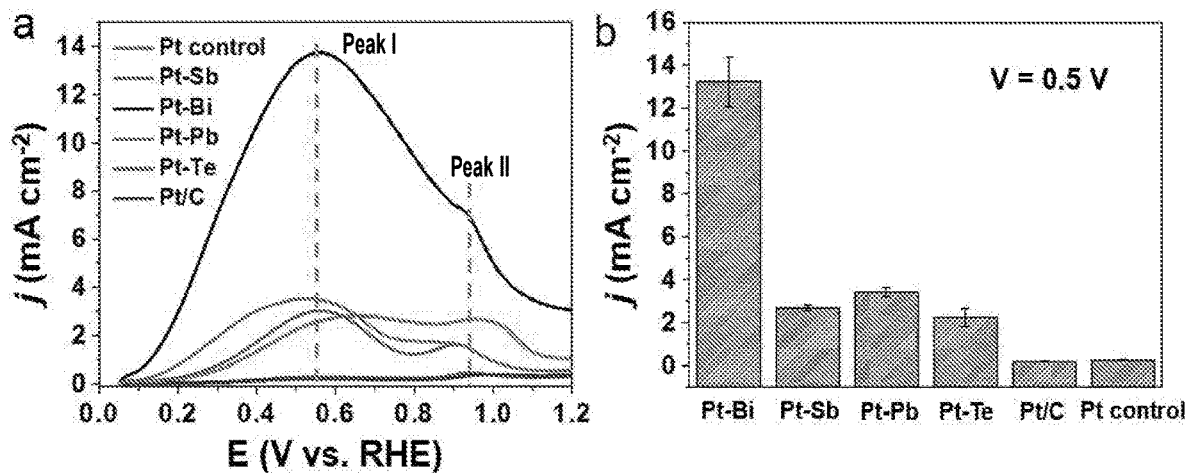
FIG. 4 shows in (a) Polarization curves and (b) histograms of the specific activities at 0.5 V of formic acid oxidation for different catalysts.
Figure 28:
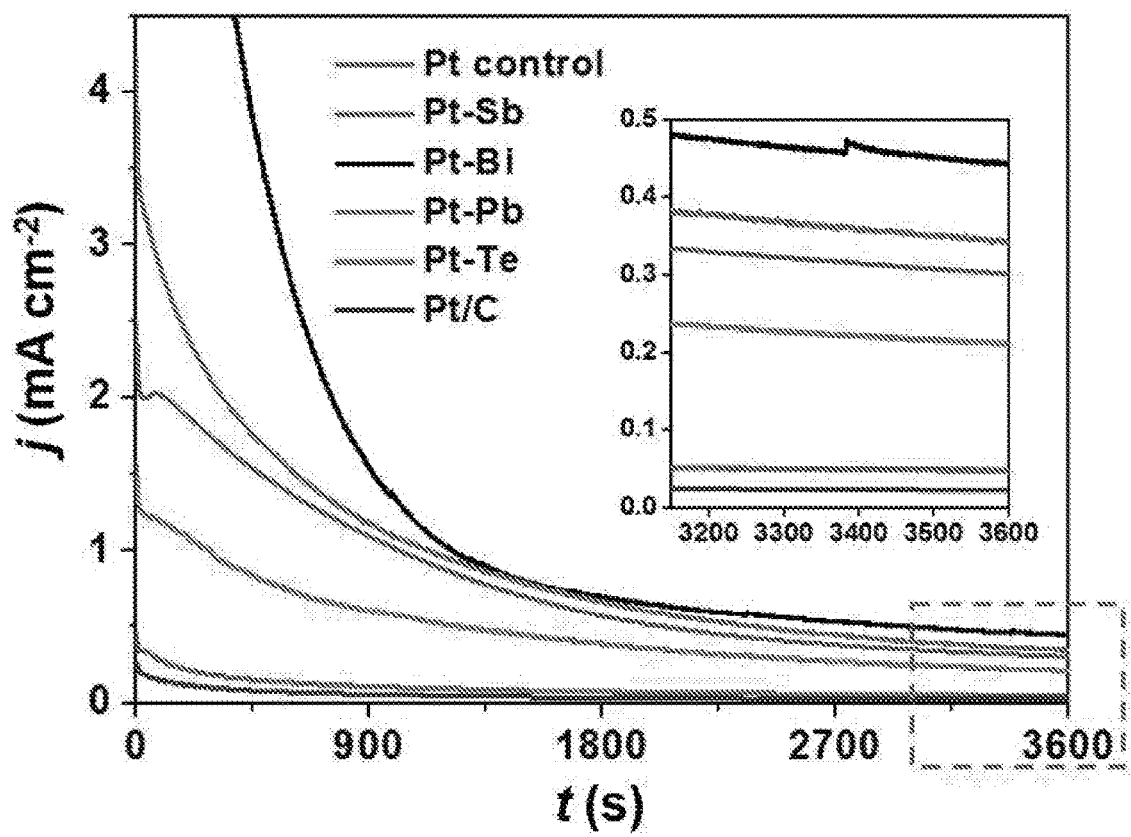
FIG. 28 shows chronoamperometry curves for the Pt-M (M=Sb, Bi, Pb and Te) catalysts, Pt control sample and commercial Pt/C catalysts in Ar-saturated 0.5 M HCOOH+ 0.5 M $H_2SO_4$ solution for 3600 s at 0.5 V. The inset shows the magnified view of the boxed area.
Figure 29:
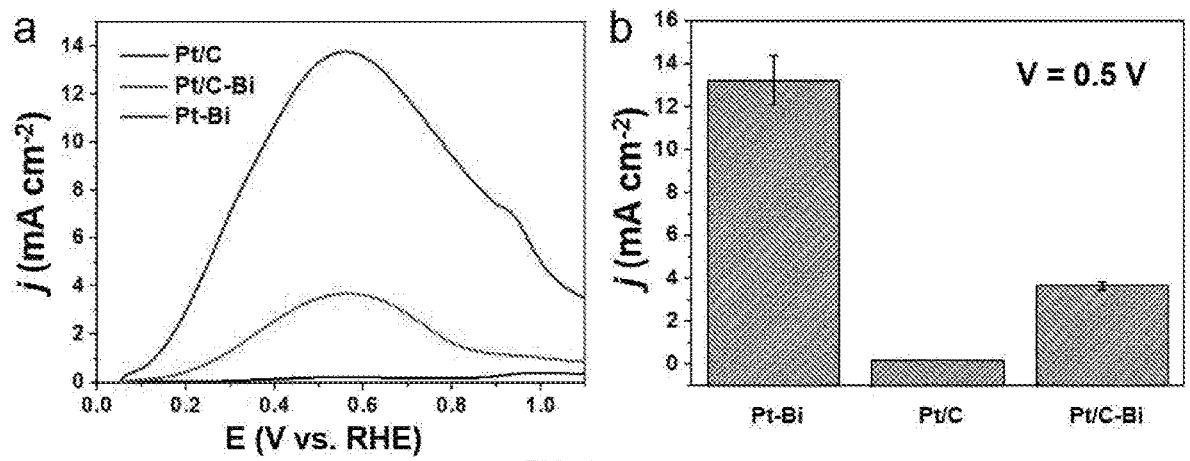
FIG. 29 shows in (a) Polarization curves and (b) histograms of the specific activities at 0.5 V of formic acid oxidation for different catalysts.
Figure 30:
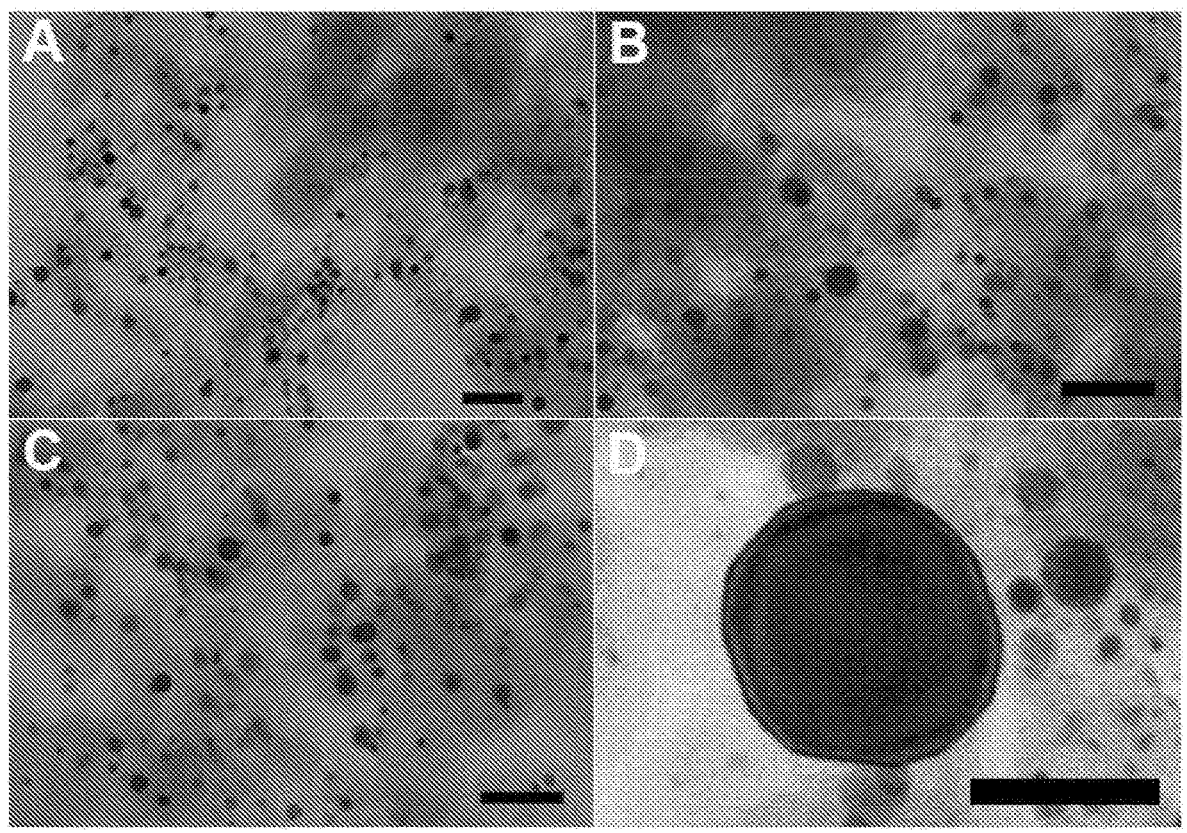
FIG. 30 shows STEM images of the synthesized catalysts on carbon black. The truncated THH shape can be clearly identified from the occasionally observed large particles. Scale bars: 50 nm.

The elements Sb, Bi, Pb, and Te are favorable for promoting the catalysts' efficiency and stability toward the electrooxidation of formic acid (L. An et al., *Nano Energy* 15, 24-32 (2015)), an attractive choice for chemical fuels in fuel cells. Furthermore, {210} facets possess the highest density of step atoms in the [001] zone and are the most "open" planes of an fcc crystal. Finally, Pt nanoparticles with {210} facets have been reported to exhibit extremely high catalytic activity for formic acid electrooxidation (Sun et al., *J. Electroanal. Chem.* 370, 273-280 (1994)). The catalytic activities of bulk-scale synthesized Pt-M (M=Sb, Bi, Pb, Te) and Pd—Bi THH NPs on carbon black toward formic acid electrooxidation were studied, and confirmed that comparatively, the Pt-M (M=Sb, Bi, Pb, Te) THH NPs as described herein are catalytically more active than commercial Pt/C and Pd/C catalysts (FIG. 4, FIGS. 27-31, FIG. 34 in C to E and FIG. 35). The catalytic activities of bulk scale synthesized Pt-M (M=Sb, Bi, Pb, Te) nanoparticles on carbon black towards formic acid electrooxidation as compared to that of commercial Pt/C catalysts were tested (FIG. 4, FIG. 26-28) As is well known, formic acid electrooxidation on the catalyst's surface usually follows dual pathways: 1) a direct dehydrogenation pathway and 2) an indirect dehydration pathway (Yu et al., *J. Power Sources* 182, 124-132 (2008), Rice et al., *J. Power Sources.* 111, 83-89 (2002)). Peak I at ~0.5 V corresponds to the oxidation of formic acid via the dehydrogenation pathway, and peak II at ~0.9 V corresponds to the oxidation of $CO_{ads}$ formed via the dehydration pathway (FIG. 4 in a). The predominance of the indirect pathway on commercial Pt/C catalysts impedes its application in the direct formic acid fuel cells (Yu et al., *J. Power Sources* 182, 124-132 (2008), Rice et al., *J. Power Sources.* 111, 83-89 (2002)). However, the synthesized THH-shaped Pt—Bi catalysts favors the direct pathway with little evidence of contribution via the indirect pathway. The higher $i_{peak\ I}$ versus $i_{peak\ II}$ ratios (R) for the THH-shaped Pt—Pb (R=2.1), Pt—Sb (R=1.8), and Pt—Te (R=1.1) catalysts compared to commercial Pt/C catalysts (R=0.5) also indicates that the direct dehydration pathway is more favorable for these catalysts. Specifically, at 0.5 V, the current densities of the Pt—Bi (13.25 $mA/cm^2$), Pt—Pb (3.43 $mA/cm^2$), Pt—Sb (2.71 $mA/cm^2$) and Pt—Te (2.26 $mA/cm^2$) catalysts were 63, 16, 13, and 11 times higher than that of commercial Pt/C catalysts (0.21 $mA/cm^2$), respectively. Importantly, Pt nanoparticles synthesized without using foreign metal elements exhibit poor catalytic activity (Pt control sample, 0.28 $mA/cm^2$ at 0.5 V), underscoring the catalytic benefit deriving from shape control and foreign metal modification. Additionally, to differentiate the importance of shape control from foreign metal modification, modified commercial Pt/C catalysts with Bi atoms was made through repetitive electrochemical deposition and evaluated its catalytic properties. Under identical condition, this material exhibited a current density of 3.65 $mA/cm^2$ at 0.5 V, one-fourth that of the THH-shaped Pt—Bi catalysts (FIG. 29). Taken together, one must conclude that the high-index facets, in addition to foreign metal modification, are major factors in catalytic performance. Finally, amperometric i-t curves (FIG. 28) show that these THH-shaped catalysts are robust. At a fixed potential of 0.5 V, after 1 h of continuous operation, the measured current densities were: 0.44 $mA/cm^2$ for THH-shaped Pt—Bi, 0.34 $mA/cm^2$ for THH-shaped Pt—Pb, 0.30 $mA/cm^2$ for THH shaped Pt—Sb, and 0.21 $mA/cm^2$ for THH-shaped Pt—Te (22, 17, 15 and 11 times higher, respectively, than that of commercial Pt/C catalysts (0.02 $mA/cm^2$)).

Figure 32:
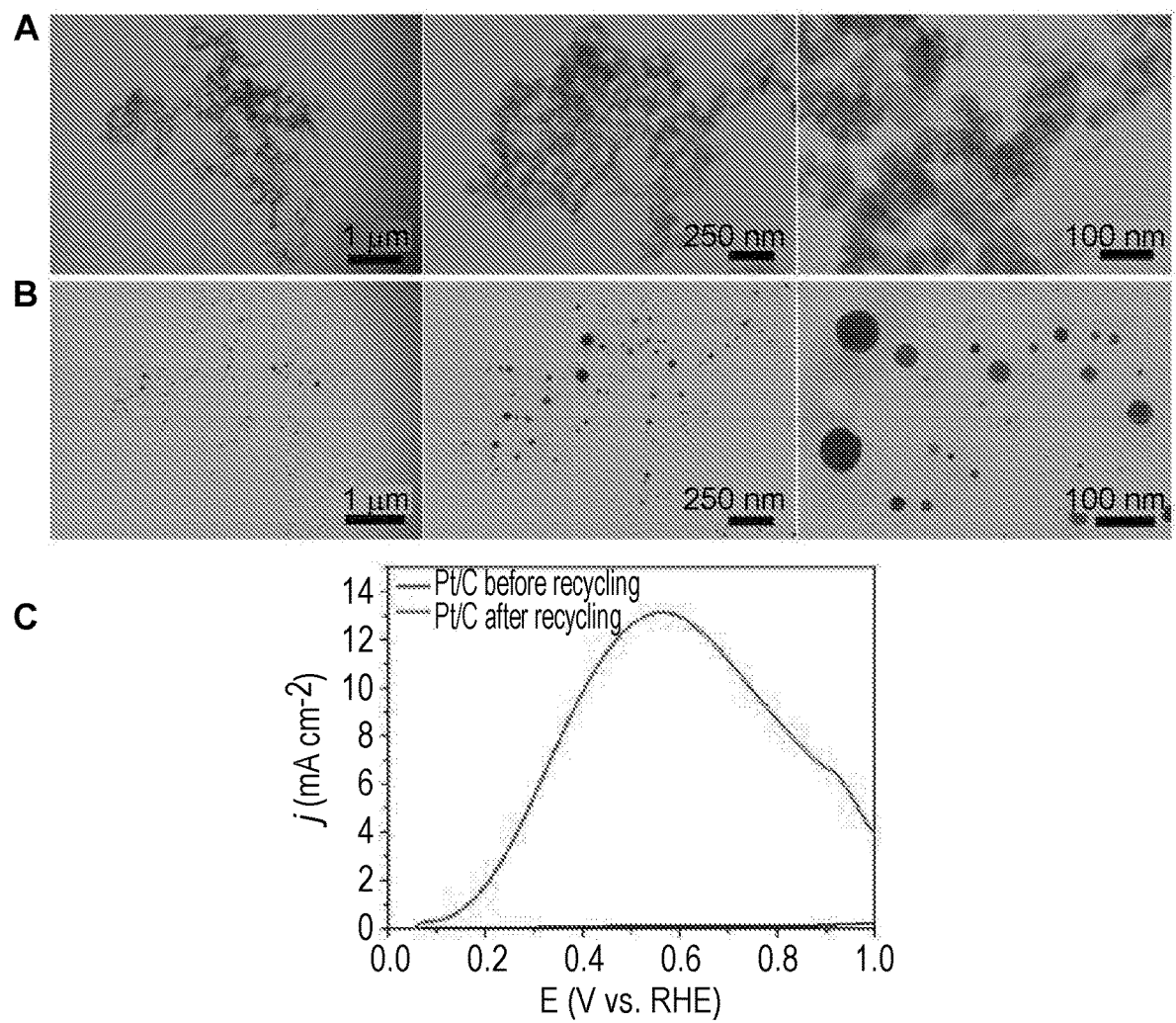
FIG. 32 shows STEM images of the (A) deactivated commercial Pt/C catalyst, and (B) THH-shaped Pt particles formed by heating the commercial catalyst in (A) at 900° C. for 1 h with 1 mg of Bi powder as the source. The areas imaged in (A) and (B) are identical. Each column is a magnified view of the former column. (C) Polarization curves for commercial Pt/C catalyst before and after recycling.

Unlike conventional high-index facet nanoparticle synthesis methods, the method described herein is remarkably easy to employ, scalable, and effective for industrial production. Additionally, because deactivated structures that have lost their high-index facets can be recycled by the method herein described, the method is particularly attractive for catalyst recovery and reactivation, processes that have been further investigated and characterized with a commercial catalyst sample (FIG. 32).

EXAMPLES

Materials and Methods

Sb powder (99.5%), Bi powder (99.99+%), Pb powder (99.95%), Te powder (99.997%), cetyltrimethylammonium bromide (CTAB, >99%), L-ascorbic acid (>99%), metal compounds ($H_2PtCl_6 \cdot 6H_2O$, $Na_2PdCl_4$, $Na_3RhCl_6$, $HAuCl_4 \cdot 3H_2O$, $Co(NO_3)_2 \cdot 6H_2O$, $Ni(NO_3)_2 \cdot 6H_2O$, and $Cu(NO_3)_2 \cdot xH_2O$), formic acid (95%), sulfuric acid (99.999%), Pt/C catalyst (20 wt. % Pt loading), Pd/C catalyst (10 wt. % Pd loading), and Nafion solution (5 wt. %) were purchased from Sigma-Aldrich. Carbon black powder (Vulcan XC-72) was purchased from Cabot. Silicon wafers were purchased from Nova Electronic Materials. The above materials were used as-received. All water used in the experiments was Millipore ultrapure water (18.2 MΩ·cm).

Synthesis of Pt-M (M=Sb, Bi, Pb, or Te), Pd-M (M=Sb, Bi, Pb, or Te), Rh-M (M=Bi or Te), Ni—Bi, Co—Bi, and bimetal-Bi THH-shaped particles on a silicon wafer: A piece of silicon wafer was first treated with an oxygen plasma at 60 W for 5 min, followed by spin-coating 200 μL of an aqueous solution of metal precursor (mixtures) of interest (10.75 mg/mL $H_2PtCl_6 \cdot 6H_2O$ for Pt, 6.11 mg/mL $Na_2PdCl_4$ for Pd, 7.97 mg/mL $Na_3RhCl_6$ for Rh, 12.08 mg/mL $Ni(NO_3)_2 \cdot 6H_2O$ for Ni, 12.07 mg/mL $Co(NO_3)_2 \cdot 6H_2O$ for Co, 7.78 mg/mL $Cu(NO_3)_2 \cdot xH_2O$ for Cu, and 16.33 mg/mL $HAuCl_4 \cdot 3H_2O$ for Au) for 60 s at 1000 rpm with a ramping rate of 500 rpm/s. After drying in air, the silicon wafer was placed in the center of a tube furnace. Approximately 1 mg of Sb (or Bi, Pb, and Te) powder loaded in a combustion boat was placed near the silicon wafer upstream in the furnace. For convenience, the foreign metal powders can also be loaded directly onto the Si wafer. The thermal treatment was programmed as follows: under $H_2$ gas flow, ramp to 600° C. within 12 min, hold at 600° C. for 10 min, cool down to 25° C. within 1 h, switch the atmosphere to Ar (or $Ar/H_2$ mixture). The high temperature treatment differed for the different combinations. (1) To synthesize Pt-M (M=Sb, Bi, Pb, or Te), Ni—Bi, Co—Bi, PtNi—Bi, PtCo—Bi, and PtCu—Bi particles: ramp to 900° C. in 20 min, hold at 900° C. for 1 h. (2) To synthesize Pd—Bi, Rh—Bi, PdPt—Bi, PdAu—Bi, PdNi—Bi, PdCo—Bi, PdCu—Bi, RhPt—Bi, RhCo—Bi, and RhNi—Bi particles: ramp to 1000° C. in 20 min, hold at 1000° C. for 1 h. (3) To synthesize Pd-M (M=Sb, Pb, or Te) and Rh—Te particles: ramp to 1200° C. in 4 h, hold at 1200° C. for 1 h. For all combinations, the tube was quenched to room temperature upon completion of the thermal treatment (samples were still in an Ar or $Ar/H_2$ atmosphere). The flow rate for Ar (or $Ar/H_2$ mixture) is 200 sccm.

Alternative synthesis of Pt-M (M=Sb, Bi, Pb and Te), Pd-M (M=Sb, Bi, Pb and Te) and Rh-M (M=Bi and Te) truncated THH-shaped particles on silicon wafer: Approximately 1 mg of Sb (or Bi, Pb and Te) powder loaded in a combustion boat was placed in the center of a tube furnace as the source. A piece of silicon wafer was first treated with an oxygen plasma at 60 W for 5 min, followed by spin-coating an aqueous solution of $H_2PtCl_6 \cdot 6H_2O$ ($Na_2PdCl_4$ for Pd and $Na_3RhCl_6$ for Rh) for 60 s at 1000 rpm with a ramping rate of 500 rpm/s. After drying in air, the silicon wafer was placed near the metal powder source in the downstream of the furnace. The thermal treatment was programmed as follows: under $H_2$ gas flow, ramp to 600° C. within 12 min, hold at 600° C. for 10 min, cool down to 25° C. within 1 h, switch the atmosphere to Ar. The high temperature treatment differed from each other. (1) For synthesizing Pt-M (M=Sb, Bi, Pb and Te) particles: ramp to 900° C. in 20 min, hold at 900° C. for 1 h. (2) For synthesizing Pd—Bi and Rh—Bi particles: ramp to 1000° C. in 20 min, hold at 1000° C. for 1 h. (3) For synthesizing Pd-M (M=Sb, Pb and Te) and Rh—Te particles: ramp to 1200° C. in 4 h, hold at 1200° C. for 1 h. The tube was quenched to room temperature upon completion of the thermal treatment (The samples were still in an Ar atmosphere).

Synthesis of uniform Pd nanocubes. Monodisperse Pd nanocubes were synthesized based on literature methods but with minor changes (Niu et al., *Cryst. Growth Des.* 8, 4440-4444 (2008)). (1) 22 nm Pd edge length nanocubes were synthesized by adding 1 mL of 10 mM $H_2PdCl_4$ solution in one aliquot to a 20 mL of 12.5 mM CTAB solution, while stirring. The resulting solution was heated in an oil bath at 95° C. for 5 min. Then, 160 μL of 100 mM ascorbic acid solution was added to the mixture in one aliquot. After 30 min of additional stirring and heating at 95° C., the solution was cooled down to room temperature and used without purification as a seed solution for growing larger Pd nanocubes. (2) Synthesis of ~50 nm edge length Pd nanocubes. 125 μL of 10 mM $H_2PdCl_4$ solution and 80 μL of the as-prepared seed solution were added to 5 mL of 100 mM CTAB, followed by adding 50 μL of 100 mM ascorbic acid solution. The resulting solution was mixed thoroughly by a vortex mixer and was placed in a water bath at 40° C. for 24 h. The nanocubes were collected by centrifugation (two cycles at 8000 rpm), resuspended in water, and then dispersed onto the substrate. Following drying in air, they were used as starting materials for the THH shape regulation experiments. The shape regulation treatment was the same as that used for synthesizing Pd—Bi THH.

Preparation of working electrode. For synthesizing THH-shaped Pt-M (M=Sb, Bi, Pb, or Te) particles on carbon black, 5 mg/mL aqueous mixtures of carbon black powder and $H_2PtCl_6 \cdot 6H_2O$ (20 wt. % Pt loading) were ultrasonicated for 60 min. After drying in air in a combustion boat, the sample was placed in the center of a tube furnace. 1 mg of M powder was loaded in a combustion boat and placed in the tube, upstream of the mixtures of carbon black powder and metal precursors. For convenience, the foreign metal powders can also be mixed together with the carbon black powder and metal precursors in one combustion boat. The thermal treatment was the same as that for synthesizing THH-shaped Pt-M (M=Sb, Bi, Pb, or Te) particles on a silicon wafer. The as-prepared sample was collected and dispersed in water (5 mg/mL). 5 μL of the dispersion was transferred onto a rotating disk electrode (RDE) (3 mm diameter). After drying at room temperature, 2 μL of Nafion solution (0.5 wt. %) was deposited on the electrode surface and allowed to dry.

Alternative preparation of working electrode. For synthesizing THH-shaped Pt-M (M=Sb, Bi, Pb and Te) particles on the carbon black, 1 mg of Sb (or Bi, Pb and Te) powder loaded in a combustion boat was placed in the center of a tube furnace as the source. 5 mg/mL aqueous mixtures of carbon black powder and $H_2PtCl_6 \cdot 6H_2O$ (20% Pt loading) were ultrasonicated for 60 min. After drying in air in a combustion boat, the sample was placed in the tube, downstream of the powder source. The thermal treatment was the same as that for synthesizing THH-shaped Pt-M (M=Sb, Bi, Pb and Te) particles on the silicon wafer. The as-prepared sample was collected and dispersed in water (5 mg/mL). 5 μL of the dispersion was transferred onto a rotating disk electrode (RDE) (3 mm diameter). After drying at room temperature, 2 μL of nafion solution (0.5 wt. %) was covered on the electrode surface and allowed to dry.

Measurement of the electrochemical surface area (ECSA) and formic acid electrooxidation reaction activity for different catalysts. The electrochemical measurements were performed in a three-electrode glass cell at 298K using an Epsilon Eclipse Workstation. A coiled platinum wire and an Ag/AgCl electrode were used as the counter and reference electrodes respectively. All potentials were calibrated versus a reversible hydrogen electrode (RHE). The ECSA was determined electrochemically by the adsorption-desorption of hydrogen between 0.05 and 0.4 V and assuming 210 μC/cm$^2$ for a monolayer of adsorbed hydrogen on the Pt surface. The cyclic voltammetry (CV) measurements were carried out in 0.5 M $H_2SO_4$ under a flow of Ar gas at a sweep rate of 50 mV/s. All measurements of formic acid electrooxidation were carried out in 0.5 M $H_2SO_4$+0.5 M HCOOH at a sweep rate of 50 mV/s. The second sweeps were recorded.

Alternative measurement of the electrochemical surface area (ECSA) and formic acid electrooxidation reaction activity for different catalysts. The electrochemical measurements were performed in a three-electrode glass cell at 298K using an Epsilon Eclipse Workstation. A coiled platinum wire and an Ag/AgCl electrode were used as the counter and reference electrodes respectively. All potentials were calibrated versus a reversible hydrogen electrode (RHE). The ECSA was determined electrochemically by the adsorption-desorption of hydrogen between 0.05 and 0.4 V and assuming 210 μC/cm$^2$ for a monolayer of adsorbed hydrogen on the Pt surface. The cyclic voltammetry (CV) measurements were carried out in 0.5 M $H_2SO_4$ under a flow of Ar gas at a sweep rate of 50 mV/s. All measurements of formic acid electrooxidation were carried out in 0.5 M $H_2SO_4$+0.5 M HCOOH at a sweep rate of 50 mV/s. The second sweeps were recorded.

Characterization. Scanning electron microscopy (SEM) images were taken with a Hitachi SU-8030 field emission SEM. Scanning transmission electron microscopy (STEM) images were taken with a Hitachi HD-2300 STEM at an acceleration voltage of 200 kV. The energy-dispersive X-ray spectroscopy (EDS) spectra and elemental maps were obtained with Thermo Scientific NSS 2.3. HRTEM images were taken with a JEOL ARM 300F GrandARM TEM at an acceleration voltage of 300 kV. X-ray diffraction (XRD) spectra were collected on a Rigaku Ultima with a Cu Kα source.

Computation details. All density function theory (DFT) calculations were carried out using the Vienna Ab-initio Simulation Package (VASP) with the projected augmented wave (PAW) potentials, and Perdew-Burke-Ernzerhof (PBE) formulation of the generalized gradient approximation (GGA) (32-34). The supercell approximation was used in this study, where a surface was modeled by a crystal slab and a vacuum region which were periodically arranged along the direction perpendicular to the surface. To keep the thickness of the slab no less than 15 Å, different numbers of atomic layers were chosen for different surfaces (Table 1). The thickness of the vacuum region was 15 Å for all surfaces. The middle three layers were fixed and the rest layers were allowed to relax. An energy cutoff of 400 eV was used for the plane wave basis set used to represent the electronic wave functions. Brillouin-zone integrations were sampled using Γ-centered k-point meshes (Table 1). The specific surface energies were calculated by $\gamma=(E_{Slab}^{DFT}-\Sigma_i n_i \mu_i)/2A$, where $E_{Slab}^{DFT}$ is the total energy of the slab, $n_i$ is the number of i atoms in the slab, $\mu_i$ is the chemical potential for the element i and A is the surface area.

Experimental Results

Influence of synthetic parameters: The formation of THH morphology was influenced by the reaction temperature, time and the amount of Sb powder source (FIGS. 5-6). When using 1 mg of Sb powder as the source, at 600° C., the shape of Pt particles remained irregular even after reacting for 12 h. At the start of the reaction at 800° C., the particles exhibited irregular shape. After reacting for 30 min, cubic particles were observed. After 1-12 h thermal treatment, Pt particles could take on the THH shape, but the surfaces of these particles were quite rough, with nanoscopic terrace-and-step structures forming on the high-index planes. At 900° C., the morphology of particles was also irregular at the start of the reaction. However, after 1-h thermal treatment, THH-shaped particles with smooth surfaces were produced. These observations indicate that a high temperature of around 900° C. is required for producing THH-shaped Pt particles with smooth surfaces. With another 3-h thermal treatment, the original sharp THH particles were getting destroyed with edge being truncated and tended to exhibit more spherical shape. The THH-shaped particles synthesized after reacting at 1000° C. for 1 h were already slightly destroyed, indicating a decreased time window for generating high quality THH at 1000° C. than that at 900° C.

The amount of the Sb powder source also has significant influence on the formation of THH morphology. When the Sb amount was reduced to 0.1 mg, the time required to form THH-shaped Pt particles was shortened to 30 min. While if 10 mg of Sb powder was supplied every 30 min, even after reacting for 1 h, there were no THH-shaped Pt particles observed. The above results indicate that the formation of the THH shape will be delayed when excessive amounts of Sb powder source is used. However, Sb was found to be necessary in inducing the Pt THH shape formation during the synthesis: Pt particles synthesized after reacting at 900° C. for 1 h without using Sb powder were found to exhibit irregular shapes enclosed by low-index facets, and no THH-shaped Pt particles were found (FIG. 7).

STEM and EDS results (FIGS. 8-9) confirmed that the irregularly shaped particles observed at the beginning of reaction at 900° C. were Sb-rich PtSb alloys. During the temperature ramping period to 900° C., Sb was melted and evaporated, which was then carried to Pt nanoparticle sites by the flowing Ar gas. The strong interaction between Sb and Pt led to the formation of PtSb alloyed particles. The particles kept undergoing shape reconstruction as the reaction went on and the average Sb content in the particles dropped continuously due to the consumption of the Sb powder source. After 30-min treatment, Sb was found to be more enriched on the particle surface and THH shapes started to form. With another 10-min of annealing, Sb was further released from the particles, but the THH morphology was maintained. These results indicate that formation of the THH-shaped Pt particles is initiated by the extraction of the excessive Sb from within the particles.

The shape of Pt particles synthesized herein was not perfectly sharp THH, but was corner- and tip-truncated with {100} and {111} planes being exposed. To exclude the possibility that the existence of these low-index facets was due to over-annealing, Pt particles were synthesized by using 1 mg Bi powder as the source and heated the spin coated sample to 800° C. with a ramping rate of 10° C./min, followed by quenching the tube in ice-cold water. According to the literature result, THH-shaped Pt particles with around 200 nm diameter can preserve their shape even when being heated to ~815° C. with a ramping rate of 7° C./min (Tian et al., *Science* 316, 732-735 (2007)). Provided herein, however, the Pt particles that exhibited THH shapes were already corner- and tip-truncated even though the thermal treatment was milder with shorter time and lower finishing temperature as compared to the literature report (FIG. 10). This result can prove that there are no perfectly sharp THH-shaped particles being produced during the synthesis process.

External Sb penetration influence on the THH morphology: To check the influence of external Sb penetration on the THH morphology, truncated THH-shaped Pt particles were first synthesized on a silicon wafer (FIG. 11 in a). After being heated at 900° C. for 30 min with 1 mg Sb powder source, the THH shape of these particles was destroyed (FIG. 11 in b). Another control experiment showed that if without additional Sb powder source, truncated THH-shaped Pt particles could retain their morphology after otherwise the same treatment (FIG. 12). These observations prove that alloying with external Sb prevents the Pt particles from forming the THH shape. According to the aforementioned time-series EDS characterization results (FIG. 8-9), expected was an excessive amount of Sb within the particles with their THH shape destroyed. Thus, the particles should still be capable of forming the THH morphology if Sb could be extracted at 900° C. To prove this, the same sample was further heated at 900° C. for 30 min without using extra Sb powder source, and the SEM images confirmed the reformation of the THH shape for the Pt particles (FIG. 11 in c). The movement and coarsening of these particles after the treatment was not as intense as those in the first step thermal annealing with 1 mg Sb powder source. However, the particles' orientations changed slightly during the extraction of Sb (FIG. 11, in d-e).

Reversible restructuring of the {210} high-index planes: When synthesizing THH-shaped Pt particles, it was crucial that upon completion of the heat treatment, the particles were quenched to room temperature by removing the tube from the furnace, in order to reduce the dwell time in the lower temperature range. If the particles were slowly cooling down to room temperature with a speed of 5° C./min, THH-shaped particles with rough surface formed (FIG. 14). This result indicates that the Sb-stabilized high-index planes are not stable and will restructure into nanoscopic terrace-and-step structures after being annealed at temperatures lower than 900° C. To further understand this phenomenon, the morphology evolution of THH-shaped Pt particles with atomically smooth {210} planes upon thermal annealing at 600° C. was tracked by SEM (FIG. 15). The nanoscopic terraces appeared and the size of {111} planes shrank after the annealing treatment. Adsorbate-induced microfaceting of high-index planes for Pt-group metals is well known in surface science (Ermanoski et al., *Surf. Sci.* 596, 89-97 (2005)). The reported studies, however, are mainly focused on the interaction between single crystalline noble metal surface and non-metal gases, such as $O_2$, CO and so on. Disclosed herein, the morphology changes of Pt nanoparticles induced by metallic element Sb. Since there was no external Sb source supplied, without intending to be bound by theory, the surface reconstruction of Pt particles was mainly due to the redistribution of Sb on the Pt surface. The EDS mapping also confirmed that there was little composition change within the particle after a 12-h thermal annealing at 600° C. (from $Pt_{76}Sb_{24}$ to $Pt_{79}Sb_{21}$, atomic composition) (FIG. 16). The atomically smooth {210} facets could be reformed by reheating the particles at 900° C. (FIGS. 14-15). This reversible surface reconstruction of Pt high-index facets has also been reported on Pt (557) and Pt (332) planes (39), belonging to the crystallographic zone of $[1\bar{1}0]$, which is different from the [001] zone for the Pt {210} planes in this work. Also, the reported surface reconstruction was induced by the external CO gas while in this study, the reversible Pt particle surface structuring was caused by the internal Sb redistribution, a novel type of particle shape recovery process.

DFT calculations: The surface slab structures (FIG. 19) were constructed using Atomic Simulation Environment (ASE) and VESTA (Momma et al., *J. Appl. Crystallogr.* 44, 1272-1276 (2011)) was used to visualize these surfaces. Foreign metal (Sb, Bi, Pb and Te) atoms were only appeared on the topmost surface layer among all surface structures. Herein, the total energy of bulk Pt per atom was chosen as the chemical potential for Pt, i.e. $\mu_{Pt} = E_{Pt}^{bulk}$. For the foreign metals (Sb, Bi, Pb and Te) that adsorbed on Pt surfaces, their chemical potentials need to be defined. Herein, Sb was taken as an example to illustrate how their chemical potentials were determined. Without intending to be bound by theory, in order to study the dependence of surface stability on the environment, $\mu_{Sb}$ was assumed to vary between thermodynamically allowed chemical potential $\mu_{Sb}^{0}$ and $\mu_{Sb}^{Sb_2Pt_3}$, where $\mu_{Sb}^{0}$ is the total energy of the elemental bulk Sb per atom, and $\mu_{Sb}^{Sb_2Pt_3}$ is related to $\mu_{Pt}$ through $3\mu_{Pt} + 2\mu_{Sb}^{Sb_2Pt_3} = 5E_{tot}^{Sb_2Pt_3}$ ($E_{tot}^{Sb_2Pt_3}$ is the total energy of the compound $Sb_2Pt_3$ per atom). The compound $Sb_2Pt_3$ has the greatest Sb percent within Pt—Sb alloy region according to the convex hull from Open Quantum Materials Database (OQMD) (Saal et al., *JOM* 65, 1501-1509 (2013), Kirklin et al. *npj Comput. Mater.* 1, 15010 (2015)). Therefore, $\mu_{Sb}^{Sb_2Pt_3}$ will be the lower bound of the chemical potential for Sb. Similarly, the chemical potential ranges were obtained for the other three metals Bi, Pb and Te (Table 2).

Figure 19:
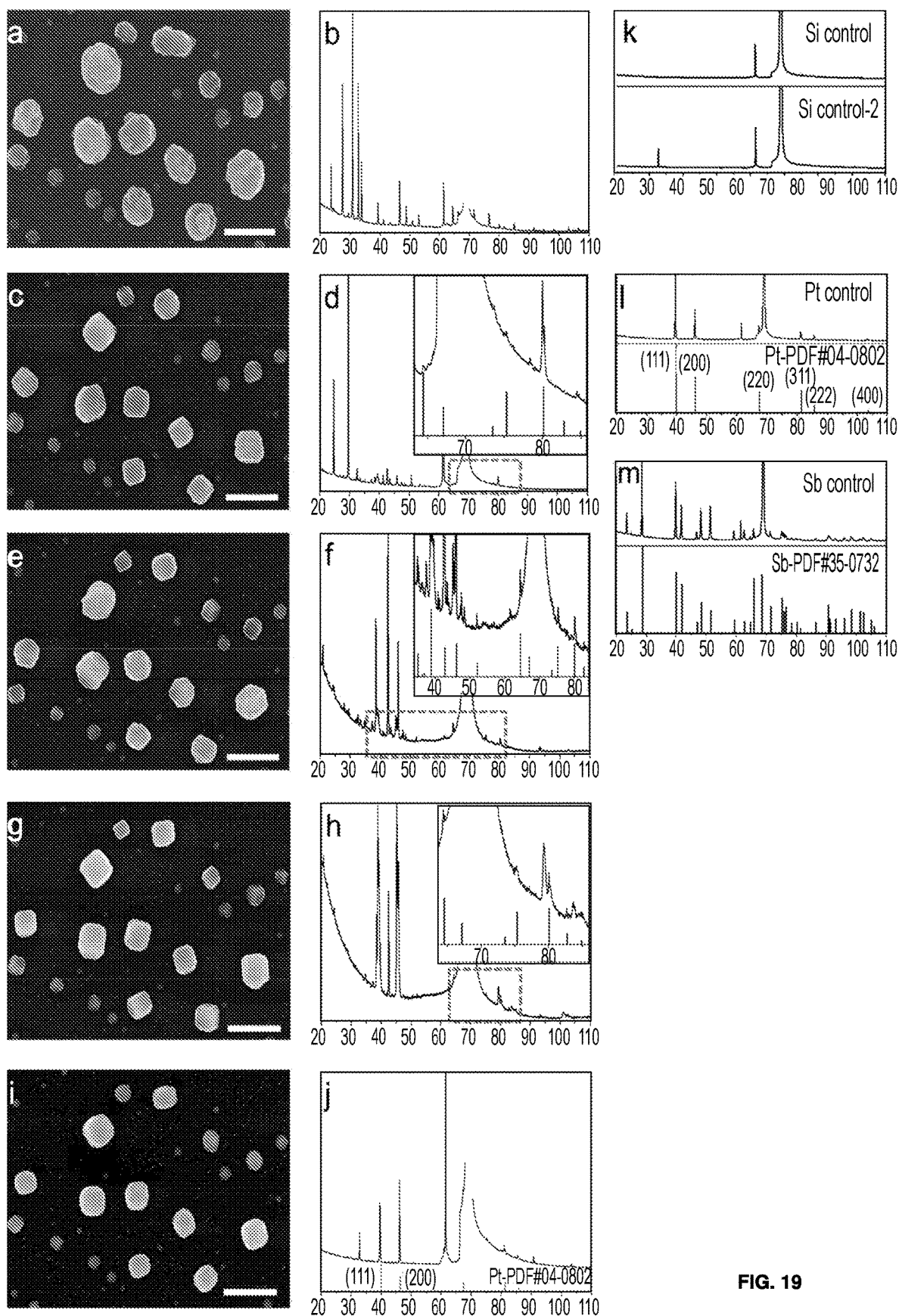
FIG. 19 shows SEM images (left column) and corresponding XRD patterns (middle column) of the particles synthesized after heating at 900° C. for (in a,b) 0 min, (in c,d) 10 min, (in e,f) 20 min, (in g,h) 30 min and (in i, j) 40 min. In (d), (f) and (h), the insets are the magnified views of the boxed area and peak positions of the $Pt_3Sb$ intermetallic phase is marked by the reference lines. The XRD patterns in the right column are from in (k) the silicon wafer, (l) pure Pt particles on the silicon wafer synthesized by directly decomposing $H_2PtCl_6$ salt at 900° C. for 10 min, and (m) the pure Sb powder used in this work. Scale bars: 500 nm.
Figure 20:
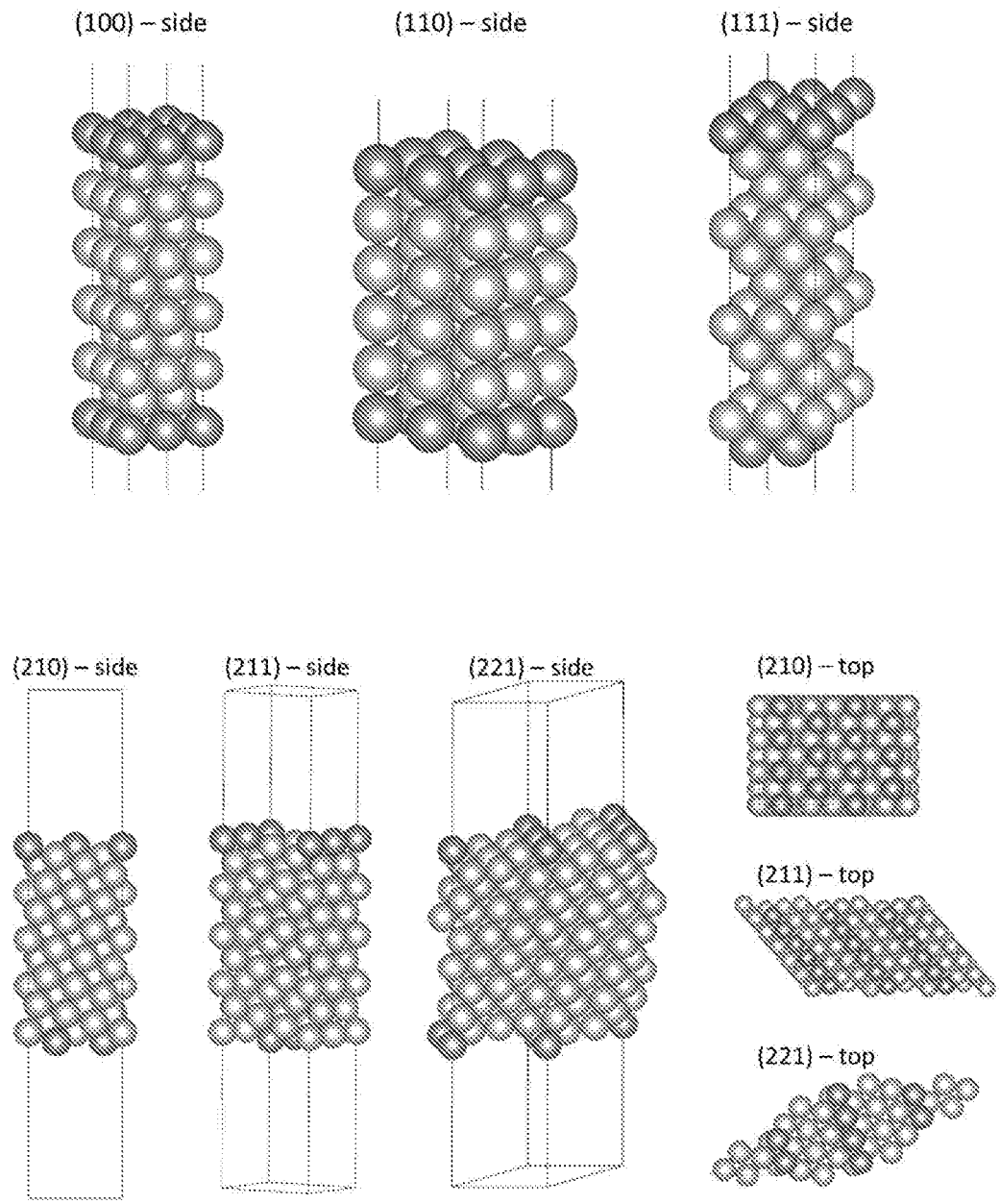
FIG. 20 shows slab structures of Pt facets decorated with foreign metals (Sb, Bi, Pb and Te). The silver and brown atoms represent Pt and foreign metals (Sb, Bi, Pb and Te), respectively.
Figure 21:
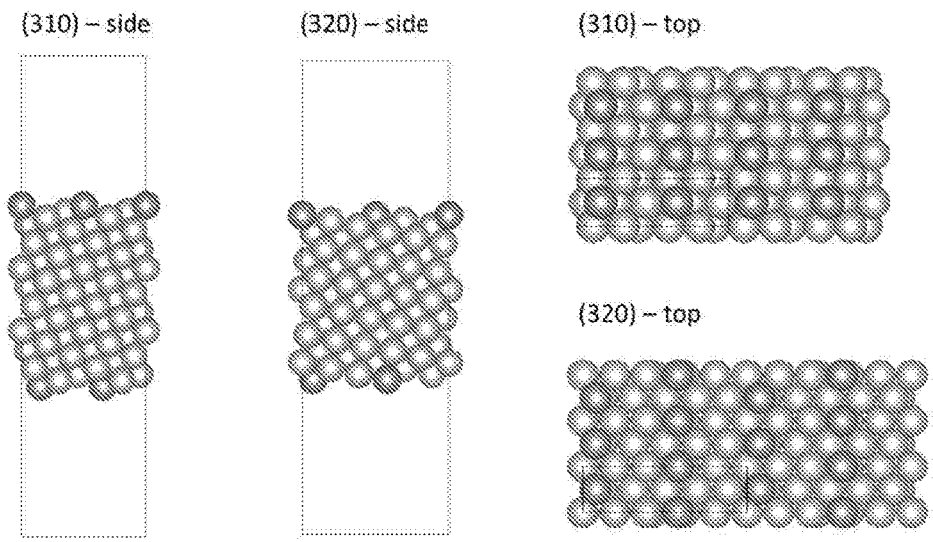
FIG. 21 shows slab structures of Pt facets decorated with foreign metals (Sb, Bi, Pb and Te). The silver and brown atoms represent Pt and foreign metals (Sb, Bi, Pb and Te), respectively.
Figure 22:
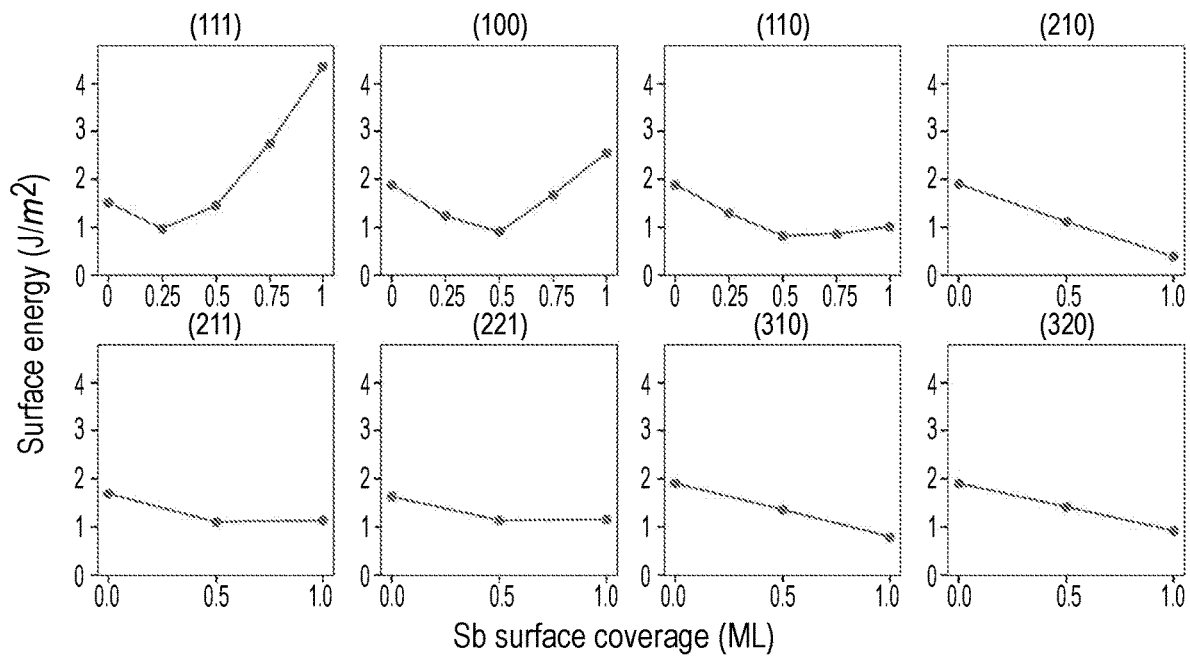
FIG. 22 shows specific surface energies of different modified Pt facets as functions of the surface coverage of the foreign metals (Sb). The lowest chemical potentials for each foreign metal were used to calculate the specific surface energies.
Figure 23:
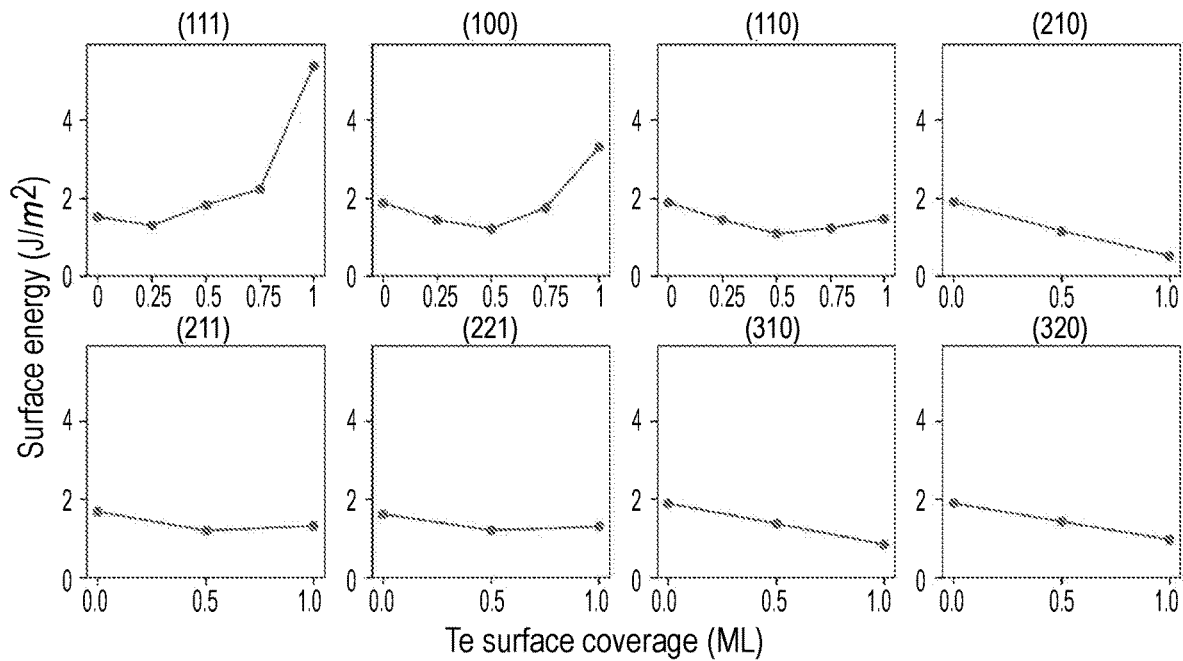
FIG. 23 shows specific surface energies of different modified Pt facets as functions of the surface coverage of the foreign metals (Te). The lowest chemical potentials for each foreign metal were used to calculate the specific surface energies.
Figure 24:
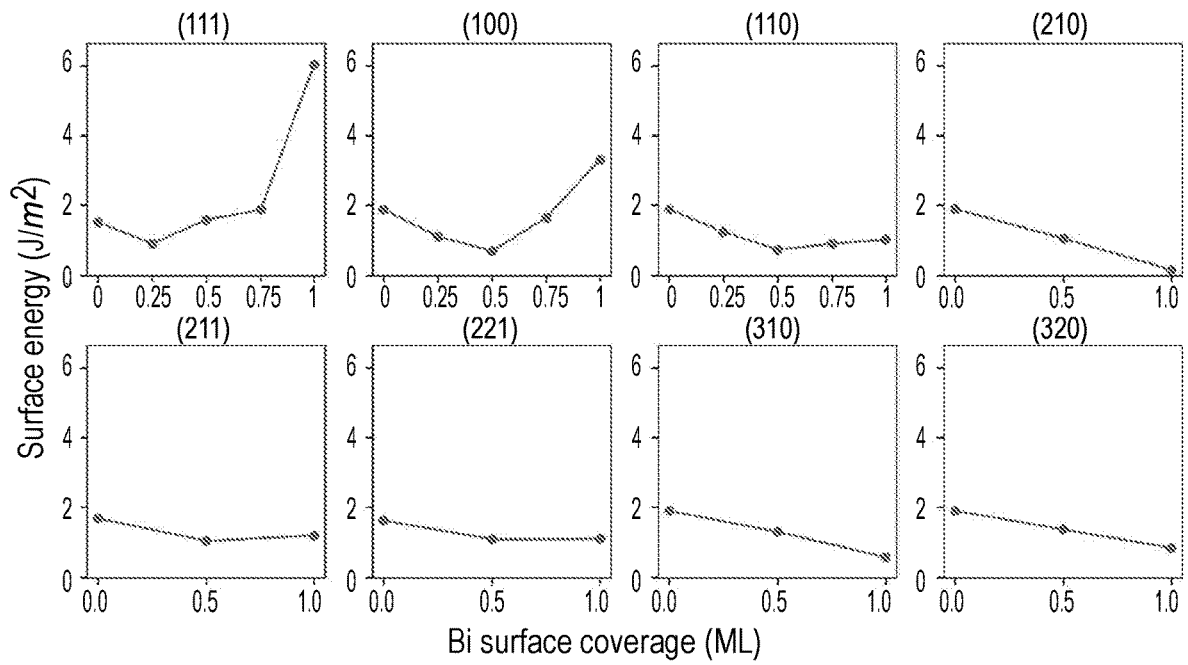
FIG. 24 shows specific surface energies of different modified Pt facets as functions of the surface coverage of the foreign metals (Bi). The lowest chemical potentials for each foreign metal were used to calculate the specific surface energies.
Figure 25:
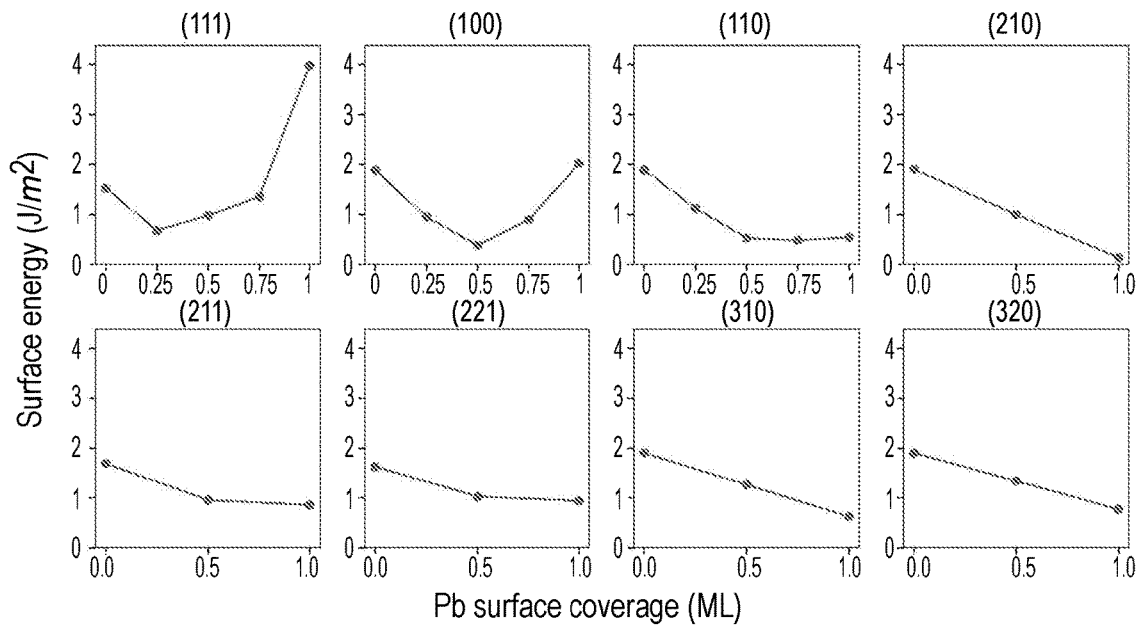
FIG. 25 shows specific surface energies of different modified Pt facets as functions of the surface coverage of the foreign metals (Pb). The lowest chemical potentials for each foreign metal were used to calculate the specific surface energies.

To confirm the capability of Sb in stabilizing {210} facets, DFT was used to calculate the specific surface energies of the (210) plane and the three low-index facets (100), (111) and (110) before and after the Sb modification (FIGS. 19-20, Tables 1-4). The computational results of these facets' energies before Sb modification were consistent with previous report (Nicholas et al., *Phys. Today* 18, 67 (1965)): the (111) plane has the lowest specific surface energy (1.519 $J/m^2$) and the energy of the (210) plane is the highest (1.900 $J/m^2$) among the four considered facets. However, after Sb modification, the specific surface energies of these facets changed dramatically, and their ordering also changed, where the energy of Pt (111)-Sb is now the highest (4.357 $J/m^2$) and Pt (210)-Sb has the lowest energy (0.392 $J/m^2$).

Figure 26:
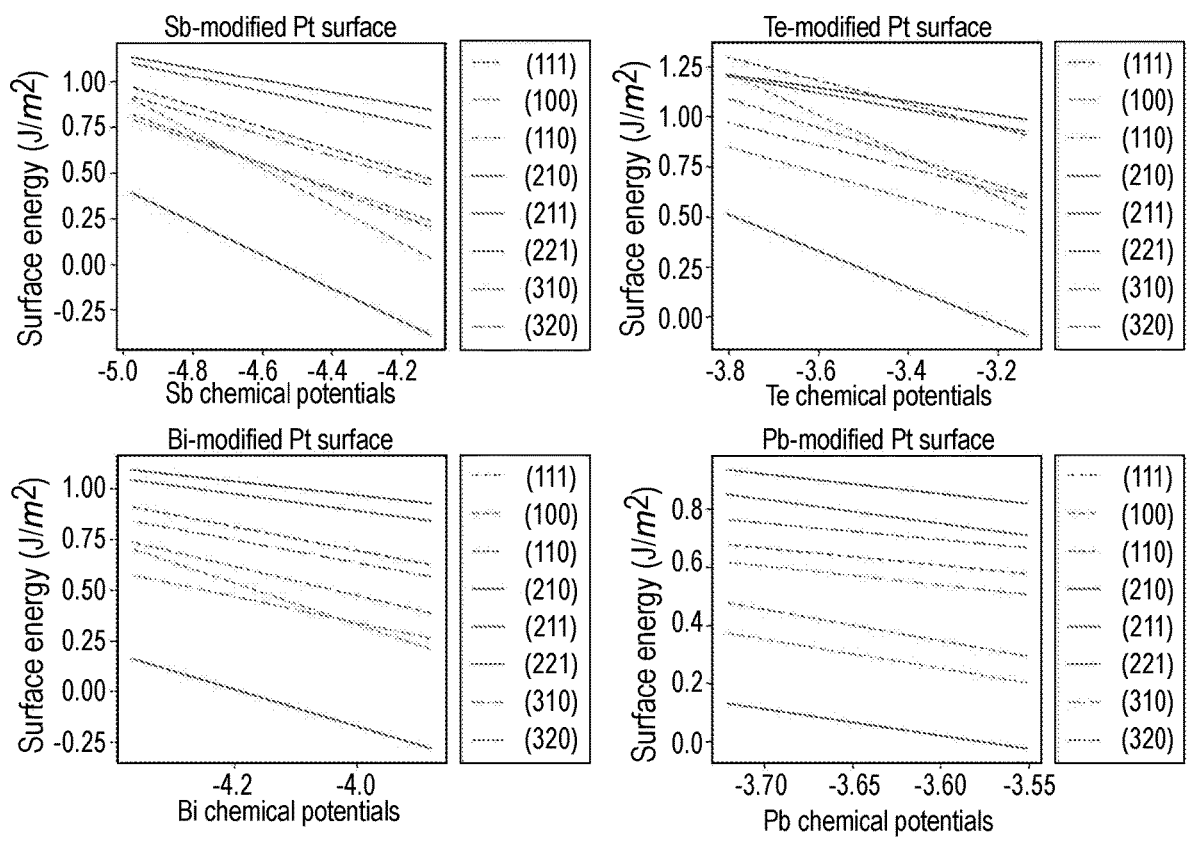
FIG. 26 shows specific surface energies of different modified Pt facets as functions of the chemical potentials of the foreign metals (Sb, Te, Bi, and Pb). For each facet, the surface coverage of the foreign metals that gave the lowest surface energy was considered in FIGS. 22-25.
Figure 27:
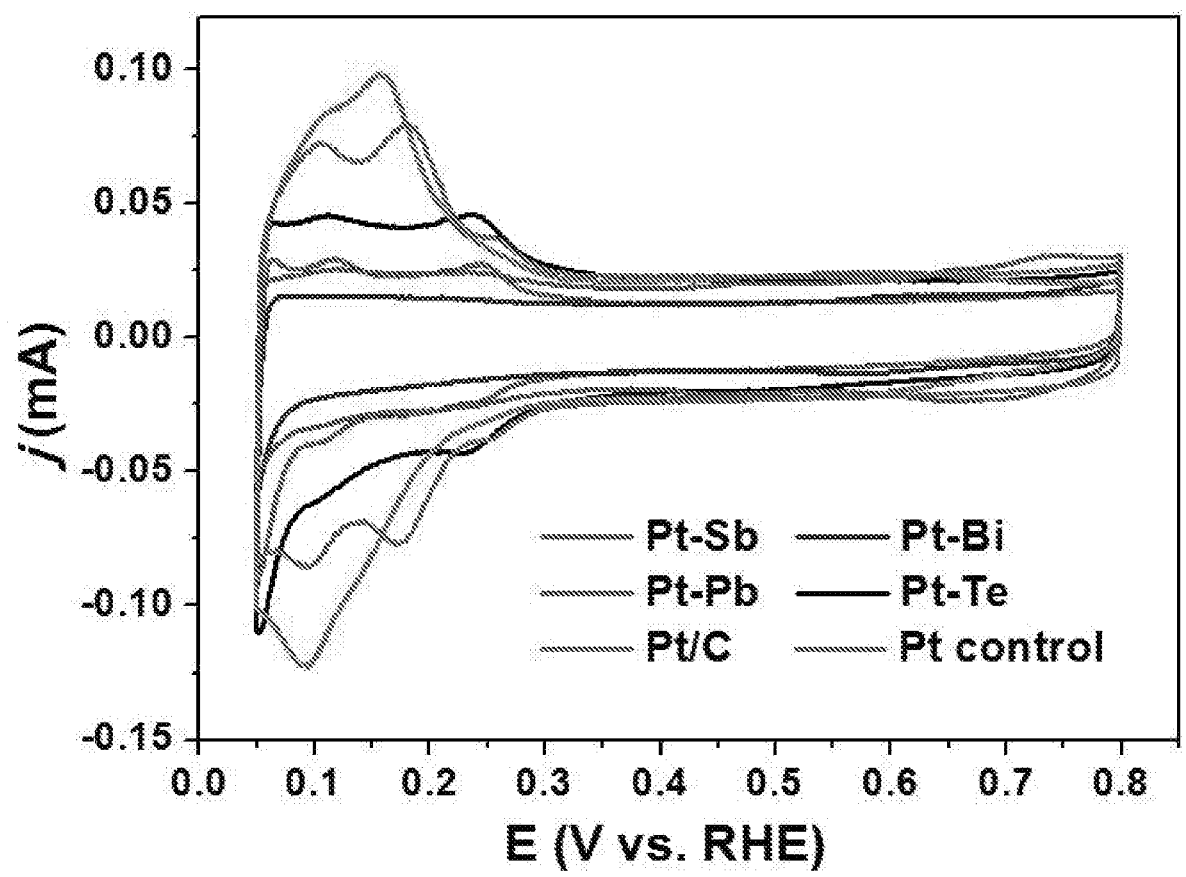
FIG. 27 shows cyclic voltammograms of the THH-shaped Pt-M (M=Sb, Bi, Pb and Te) catalysts, Pt control sample and commercial Pt/C catalysts in Ar-saturated 0.5 M $H_2SO_4$ solution. Scan rate: 50 mV s$^{-1}$.

Without intending to be bound by theory, the preferential formation of the Pt {210} facets also implies that the specific surface energy of these facets is the lowest among all types of high-index facets. In a unit stereographic triangle that is widely used to illustrate the crystal plane coordinates, (210) facet locates in the [001] crystallographic zone and can be expressed as 2(100)×(110), indicating a stepped surface composed of a terrace of an atomic width of (100) symmetry, separated by a monatomic step of (110) symmetry. With DFT, the specific surface energies of Sb-modified Pt were also calculated, (310) (=3(100)×(110)) and Pt (320) (=3 (110)×(100)) facets, representative of the stepped planes with excessive either (110) or (100) subfaces in the [001] zone. Furthermore, the specific surface energies of Sb-modified Pt (221) and Pt (211) were selected for comparison which represented the stepped planes in the other two crystallographic zones. For all the considered facets, their specific surface energies were calculated with different surface coverages of the foreign metal Sb (FIG. 22-25). The calculation results verified that the specific surface energy of Pt (210) covered with 1 monolayer (ML) of surface Sb atoms was the lowest, which supported the experimental observation. Furthermore, the influence of Sb chemical potential on the specific surface energies of these facets was explored and confirmed that after Sb modification, the Pt (210) facet always has the lowest specific surface energy (FIG. 26). Finally, DFT calculations were performed for the other three foreign metals (Bi, Pb, and Te) in the same manner and confirmed that after modification, the specific surface energy of the Pt (210) facet remained the lowest among the considered facets, regardless of the type of the foreign metals.

TABLE 1

Numbers of atomic layers and k-point grid sizes for each surface slab model.

| Miller indices (hkl) | # of atomic layers | k-point grid |
|---|---|---|
| (100) | 11 | 9 × 9 × 1 |
| (110) | 11 | 7 × 10 × 1 |
| (111) | 11 | 9 × 9 × 1 |
| (210) | 11 | 6 × 13 × 1 |
| (211) | 13 | 6 × 10 × 1 |
| (221) | 15 | 7 × 7 × 1 |
| (310) | 15 | 4 × 13 × 1 |
| (320) | 15 | 3 × 14 × 1 |

TABLE 2

Chemical potential ranges for Sb, Te, Bi, and Pb (eV/atom)

| $\mu_{Sb}^O$ | −4.117 | $\mu_{Sb}^{Sb2Pt2}$ | −4.975 |
|---|---|---|---|
| $\mu_{Te}^O$ | −3.137 | $\mu_{Te}^{Te2Pt2}$ | −3.803 |
| $\mu_{Bi}^O$ | −3.880 | $\mu_{Bi}^{Bi2Pt2}$ | −4.367 |
| $\mu_{Pb}^O$ | −3.551 | $\mu_{Pb}^{Pb1Pt2}$ | −3.721 |

TABLE 3

Specific surface energies of different Pt facets

| Miller indices (hkl) | Specific surface energies (J/m$^2$) |
|---|---|
| (111) | 1.519 |
| (100) | 1.879 |
| (110) | 1.890 |
| (210) | 1.900 |

TABLE 4

Specific surface energies of different modified Pt facets (J/m$^2$). The lowest chemical potentials for each element were used to calculate the specific surface energies.

| Miller indices (hkl) | Pt-Sb | Pt-Te | Pt-Bi | Pt-Pb |
|---|---|---|---|---|
| (210) | 0.390 | 0.514 | 0.161 | 0.131 |
| (310) | 0.792 | 0.850 | 0.576 | 0.617 |
| (110) | 0.820 | 1.090 | 0.738 | 0.478 |
| (100) | 0.905 | 1.213 | 0.704 | 0.375 |
| (320) | 0.918 | 0.970 | 0.841 | 0.763 |
| (111) | 0.970 | 1.298 | 0.911 | 0.677 |
| (211) | 1.102 | 1.201 | 1.043 | 0.850 |
| (221) | 1.136 | 1.210 | 1.092 | 0.934 |

Figure 31:
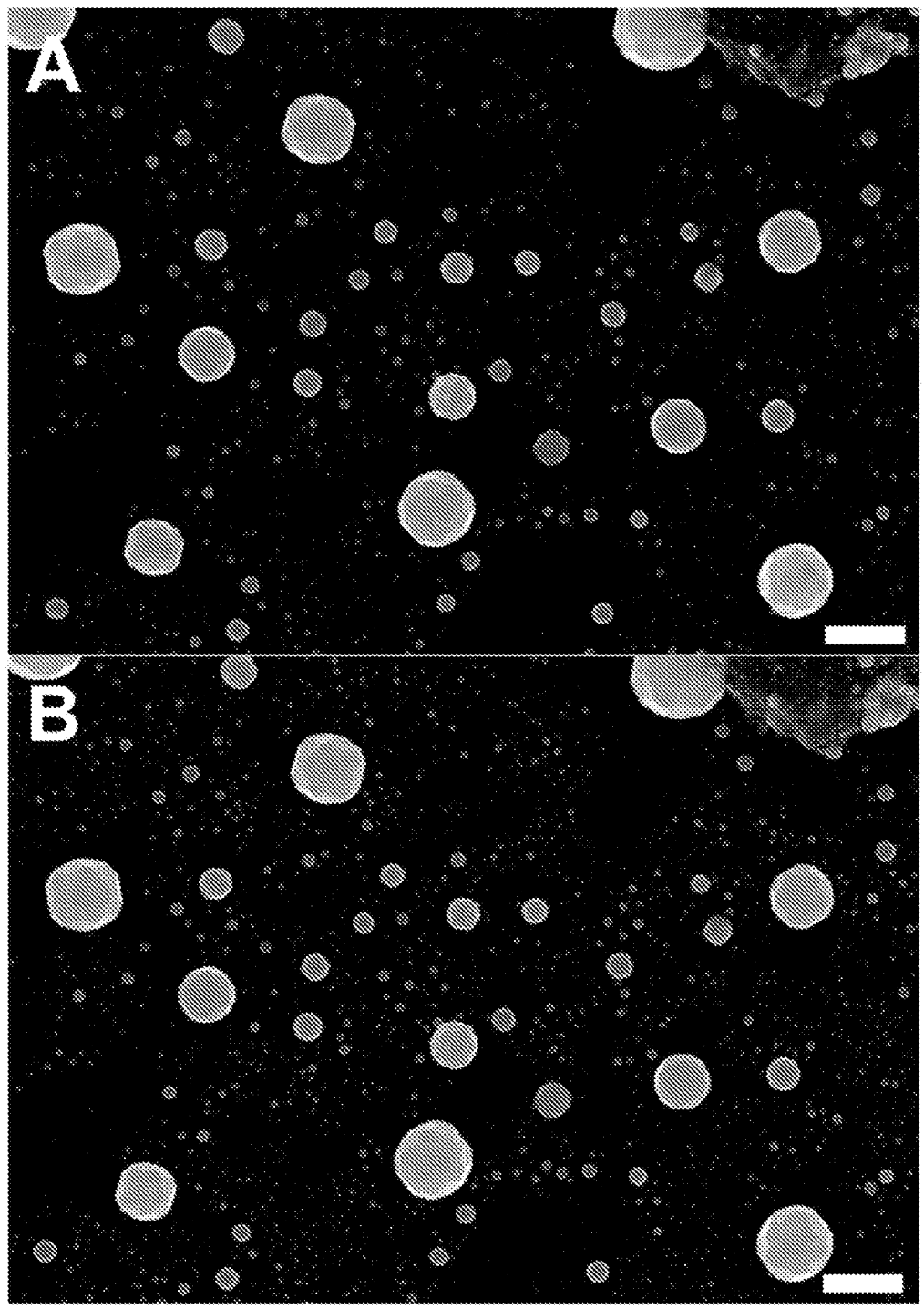
FIG. 31 shows SEM images of Pt THH-shaped nanoparticles synthesized by Bi modification (A) before and (B) after being used for formic acid electrooxidation at 0.5 V for 3600 s. Scale bars: 400 nm.
Figure 35:
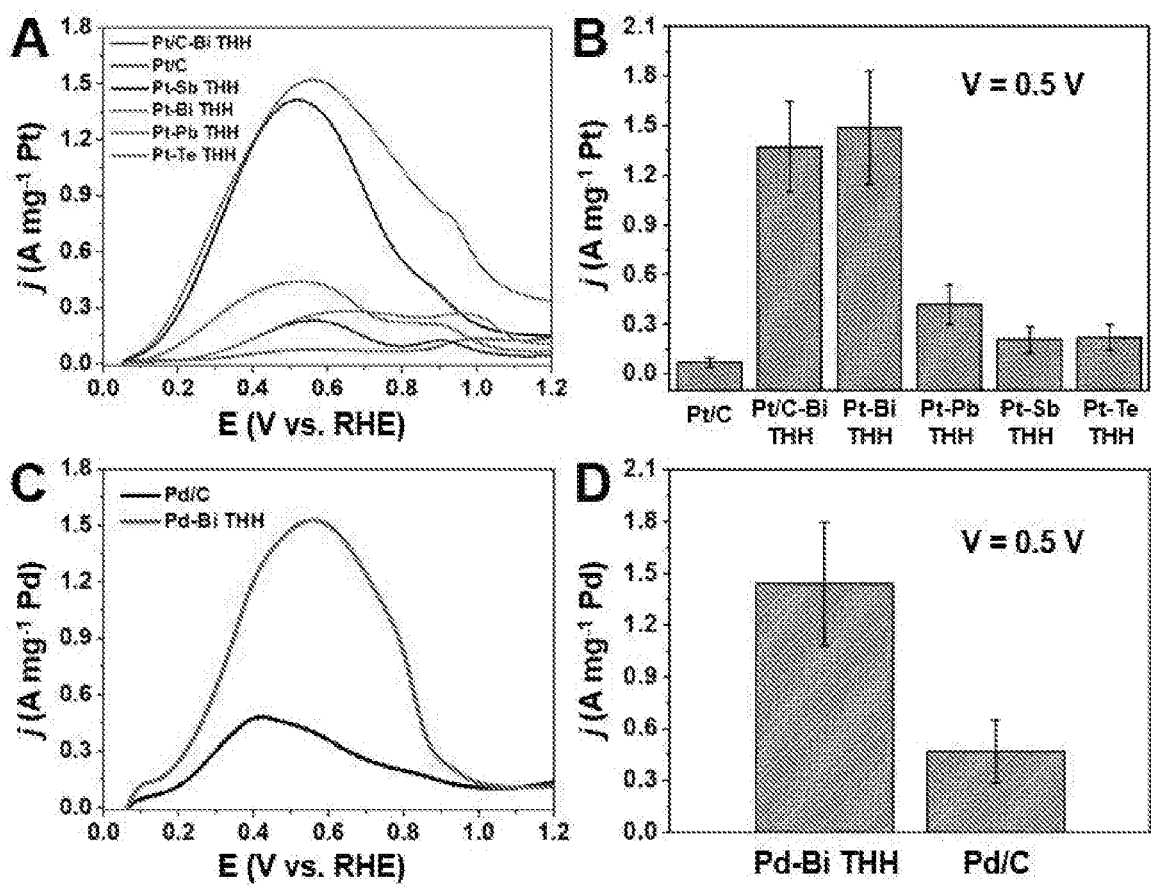
FIG. 35 shows (A) Polarization curves and (B) histograms of the mass activities at 0.5 V for formic acid oxidation with a commercial Pt/C catalyst, THH Pt-M (M=Sb, Bi, Pb, Te) catalysts, and a THH Pt catalyst synthesized through Bi modification from a commercial Pt/C catalyst (Pt/C—Bi THH). (C) Polarization curves and (D) histograms of the mass activities at 0.5 V for formic acid oxidation with a commercial Pd/C catalyst and a THH Pd—Bi catalyst.

Electrochemical characterization: Formic acid electrooxidation on the catalyst's surface usually follows dual pathways: 1) a direct dehydrogenation pathway and 2) an indirect dehydration pathways (D. Löffler, et al., *Surf. Sci.* 59, 195-204 (1976) and T. Avanesian, et al., *J. Am. Chem. Soc.* 139, 4551-4558 (2017)). Peak I at ~0.5 V corresponded to the oxidation of formic acid via the dehydrogenation pathway, and peak II at ~0.9 V corresponded to the oxidation of $CO_{ads}$ formed via the dehydration pathway (FIG. 4 in A). The predominance of the indirect pathway on commercial Pt/C catalyst impedes their application in direct formic acid fuel cells. However, the synthesized THH-shaped Pt—Bi catalyst favors the direct pathway with little contribution from the indirect pathway. The higher $i_{peak\ I}$ versus $i_{peak\ II}$ ratios (R) for the THH-shaped Pt—Pb (R=2.1), Pt—Sb (R=1.8), and Pt—Te (R=1.1) catalysts compared to commercial Pt/C catalyst (R=0.5) also indicate that the direct dehydration pathway is more favorable for these catalysts. Specifically, at 0.5 V, the current densities of the Pt—Bi (13.25 mA/cm$^2$), Pt—Pb (3.43 mA/cm$^2$), Pt—Sb (2.71 mA/cm$^2$) and Pt—Te (2.26 mA/cm$^2$) catalysts were 63, 16, 13, and 11 times higher than that of commercial Pt/C catalyst (0.21 mA/cm$^2$), respectively. Importantly, Pt nanoparticles synthesized without using foreign metal elements exhibit poor catalytic activity (Pt control sample, 0.28 mA/cm$^2$ at 0.5 V), underscoring the catalytic benefit deriving from shape control and foreign metal modification. Additionally, to differentiate the importance of shape control from foreign metal modification, commercial Pt/C catalyst was modified with Bi adatoms through repetitive electrochemical deposition (Q. S. Chen, et al., *J. Am. Chem. Soc.* 133, 12930-12933 (2011)) and their catalytic properties were evaluated. Under identical condition, this material exhibited a current density of 3.65 mA/cm$^2$ at 0.5 V, one-fourth that of the THH-shaped Pt—Bi catalyst (FIG. 29). Taken together, the high-index facets, in addition to foreign metal modification, are major factors in catalytic performance. Finally, the stability of a catalyst is typically evaluated by comparing steady-state current densities with those from a commercial Pt/C catalyst after operating for a few minutes to an hour. Amperometric i-t curves (FIG. 28) show that these THH-shaped catalysts are robust. At a fixed potential of 0.5 V, after continuous operation for 3600 s, the measured current densities were: 0.44 mA/cm$^2$ for THH-shaped Pt—Bi, 0.34 mA/cm$^2$ for THH-shaped Pt—Pb, 0.30 mA/cm$^2$ for THH-shaped Pt—Sb, and 0.21 mA/cm$^2$ for THH-shaped Pt—Te (22, 17, 15 and 11 times higher, respectively, than that of commercial Pt/C catalyst (0.02 mA/cm$^2$)). No apparent morphology changes were observed for the as-synthesized THH-shaped Pt—Bi after electrochemical testing, further confirming the intrinsic stability of the catalyst (FIG. 31). To further evaluate the practical applicability of the THH catalysts herein, their mass activities were compared (FIG. 35 in A and B). At an overpotential of 0.5 V, the current densities of THH Pt—Bi (1.49 A/mg), Pt—Pb (0.42 A/mg), Pt—Te (0.22 A/mg), and Pt—Sb (0.21 A/mg) catalysts were 21, 6, 3, and 3 times higher than that of a commercial Pt/C catalyst (0.07 A/mg), respectively. Importantly, the THH Pt catalyst synthesized through Bi modification from commercial Pt/C catalyst (Pt/C-Bi THH) exhibited a current density of 1.37 A/mg at 0.5 V, 20 times higher than that of the commercial Pt/C catalyst. In addition to Pt, Pd is also widely used as an electrocatalyst for formic acid oxidation. Pd THH particles synthesized through Bi modification exhibited a current density of 1.44 A/mg at 0.5 V, which is 3 times higher than that of commercial Pd/C catalyst (0.47 A/mg) (FIG. 35 in C and D).

Waste Catalyst: A sample of deactivated commercial Pt/C catalyst, after being used as an electrocatalyst for formic acid oxidation, was recycled with this strategy by using Bi as the trace element shape-directing metal. The STEM images in the same area confirm that the particles have been transformed into THH (FIG. 32 in A and in B). Moreover, after recycling, the perforamance of the catalyst significantly increases; at an overpotential of 0.5 V, the current densities of the catalysts, pre- and post-recycling, are 0.09 mA/cm$^2$ (before recycling) and 12.65 mA/cm$^2$ (after recycling) (FIG. 32 in C).

The invention claimed is:

1. A method of preparing tetrahexahedra ("THH") nanoparticles comprising, heating particles comprising a first metal in the presence of a second metal or metalloid at 500° C. to 1300° C. for about 0.5 hours to about 12 hours to form the THH nanoparticles; wherein the first metal comprises two or more of platinum, palladium, rhodium, nickel, cobalt, gold and copper and the second metal or metalloid comprises Sb, Bi, Pb, Te, or a combination thereof.

2. The method of claim 1, wherein the THH nanoparticles comprise high-index facets.

3. The method of claim 2, wherein the THH nanoparticles comprise one or more of {210} facets, {310} facets, a vicinal plane thereof or a combination thereof.

4. The method of claim 1, wherein the first metal is bimetallic.

5. The method of claim 4, wherein the first metal comprises PtNi, PtCo, PtCu, PdPt, PdAu, PdNi, PdCo, PdCu, RhPt, RhCo, RhNi, or a combination thereof.

6. The method of claim 1, performed in a reactor wherein the second metal or metalloid is oriented upstream of the particles, and carried to the particles via a gas flow.

7. The method of claim 6, wherein the gas comprises argon, nitrogen, helium, hydrogen, carbon monoxide, carbon dioxide, or a combination thereof.

8. The method of claim 1, wherein the particles comprising the first metal are incorporated onto a support.

9. The method of claim 8, wherein the support comprises silica, titania, ceria, alumina, zirconia, niobium oxide, zinc oxide, iron oxide, vanadium oxide, or a combination thereof.

10. The method of claim 8, wherein the support is conductive.

11. The method of claim 10, wherein the support comprises carbon black, graphene, graphite, carbon nanotube, carbon fiber, tungsten carbide, or a combination thereof.

12. The method of claim 1, wherein the particles are formed by decomposition and/or reduction of a salt of the first metal or the particles are formed from a metal alloy of the first metal.

13. The method of claim 1, wherein the second metal or metalloid is formed by decomposition and/or reduction of a salt of the second metal or metalloid.

14. The method of claim 1, wherein the first metal comprises platinum, palladium, rhodium, or a combination thereof.

15. The method of claim 1, wherein the first metal comprises platinum.

16. The method of claim 1, wherein the particles comprising the first metal are non-THH particles.

17. The method of claim 1, wherein the second metal or metalloid comprises Sb and/or Bi.

18. The method of claim 1, performed in the absence of an organic ligand.

19. The method of claim 1, further comprising catalyzing an oxidation reaction using the THH nanoparticles.

20. The method of claim 19, wherein the THH nanoparticles catalyze the oxidation of formic acid to CO and/or $CO_2$.

21. A method of preparing tetrahexahedra ("THH") nanoparticles comprising, heating particles comprising a first metal in the presence of a second metal or metalloid at 500° C. to 1300° C. for about 0.5 hours to about 12 hours to form the THH nanoparticles; wherein the first metal comprises platinum, palladium, rhodium, nickel, cobalt, or a combination thereof and the second metal or metalloid comprises Sb, Bi, Pb, Te, or a combination thereof, wherein the method is performed in a reactor wherein the second metal is oriented upstream of the particles, and carried to the particles via a gas flow.

22. A method of preparing tetrahexahedra ("THH") nanoparticles comprising, heating particles comprising a first metal in the presence of a second metal or metalloid at 500° C. to 1300° C. for about 0.5 hours to about 12 hours to form the THH nanoparticles; wherein the first metal comprises platinum, palladium, rhodium, or a combination thereof and the second metal or metalloid comprises Sb, Bi, Pb, Te, or a combination thereof.

* * * * *